US008023164B2

United States Patent
Ogawa

(10) Patent No.: US 8,023,164 B2
(45) Date of Patent: Sep. 20, 2011

(54) COLOR ADJUSTMENT APPARATUS, DISPLAY APPARATUS, PRINTING APPARATUS, IMAGE PROCESSING APPARATUS, COLOR ADJUSTMENT METHOD, GRAPHICAL USER INTERFACE DISPLAYING METHOD AND PROGRAM

(75) Inventor: Kaoru Ogawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 753 days.

(21) Appl. No.: 11/563,771

(22) Filed: Nov. 28, 2006

(65) Prior Publication Data
US 2007/0121180 A1 May 31, 2007

(30) Foreign Application Priority Data
Nov. 30, 2005 (JP) ................. P2005-345060

(51) Int. Cl.
*G03F 3/08* (2006.01)
(52) U.S. Cl. ......... 358/518; 358/1.9; 358/512; 358/520; 358/526; 358/527; 358/537; 358/538; 382/162; 382/167; 345/535; 345/549; 345/581; 345/588; 345/590; 345/593; 345/594; 345/600
(58) Field of Classification Search .................. None
See application file for complete search history.

(56) References Cited

U.S. PATENT DOCUMENTS

| 5,867,169 | A | * | 2/1999 | Prater | 345/604 |
|---|---|---|---|---|---|
| 5,930,009 | A | * | 7/1999 | Sato et al. | 358/518 |
| 6,504,551 | B1 | * | 1/2003 | Takashima et al. | 345/649 |
| 7,312,899 | B2 | * | 12/2007 | Nichogi | 358/2.1 |
| 7,428,069 | B2 | * | 9/2008 | Fujio et al. | 358/1.15 |
| 2005/0047652 | A1 | * | 3/2005 | Kagawa et al. | 382/162 |

FOREIGN PATENT DOCUMENTS

| JP | 07-099589 | 4/1995 |
|---|---|---|
| JP | 09-027916 | 1/1997 |
| JP | 10-224647 | 8/1998 |
| JP | 10-285414 | 10/1998 |
| JP | 2000-013628 | 1/2000 |
| JP | 2004-005566 | 1/2004 |
| JP | 2004-072168 | 3/2004 |
| JP | 2004-304539 | 10/2004 |
| JP | 2005-175823 | 6/2005 |

OTHER PUBLICATIONS

A Japanese Office Action dated Feb. 17, 2009 issued in connection with counterpart Japanese Patent Application No. 2005-345060.

* cited by examiner

*Primary Examiner* — Sudhanshu C Pathak
*Assistant Examiner* — Miya J Cato
(74) *Attorney, Agent, or Firm* — SNR Denton LLP

(57) ABSTRACT

Disclosed herein is a color adjustment apparatus, including: a color information storage section configured to store color information regarding an arbitrary region designated through a pointer in an editing image region; and a color coordinate explicitly displaying section configured to explicitly display a mark, which specifies color coordinates corresponding to the color information, at a pertaining position on a hue ring or a hue bar chart prepared for color adjustment.

23 Claims, 28 Drawing Sheets

| ORIGINAL IMAGE | | OUTPUT IMAGE |
|---|---|---|
| 1 BLUE | → | PURPLE |
| 2 PURPLE | → | MAGENTA |
| 3 YELLOWISH GREEN | → | YELLOW |
| 4 ORANGE | → | YELLOW |
| 5 PALE-BLUE | → | DARK PALE-BLUE |

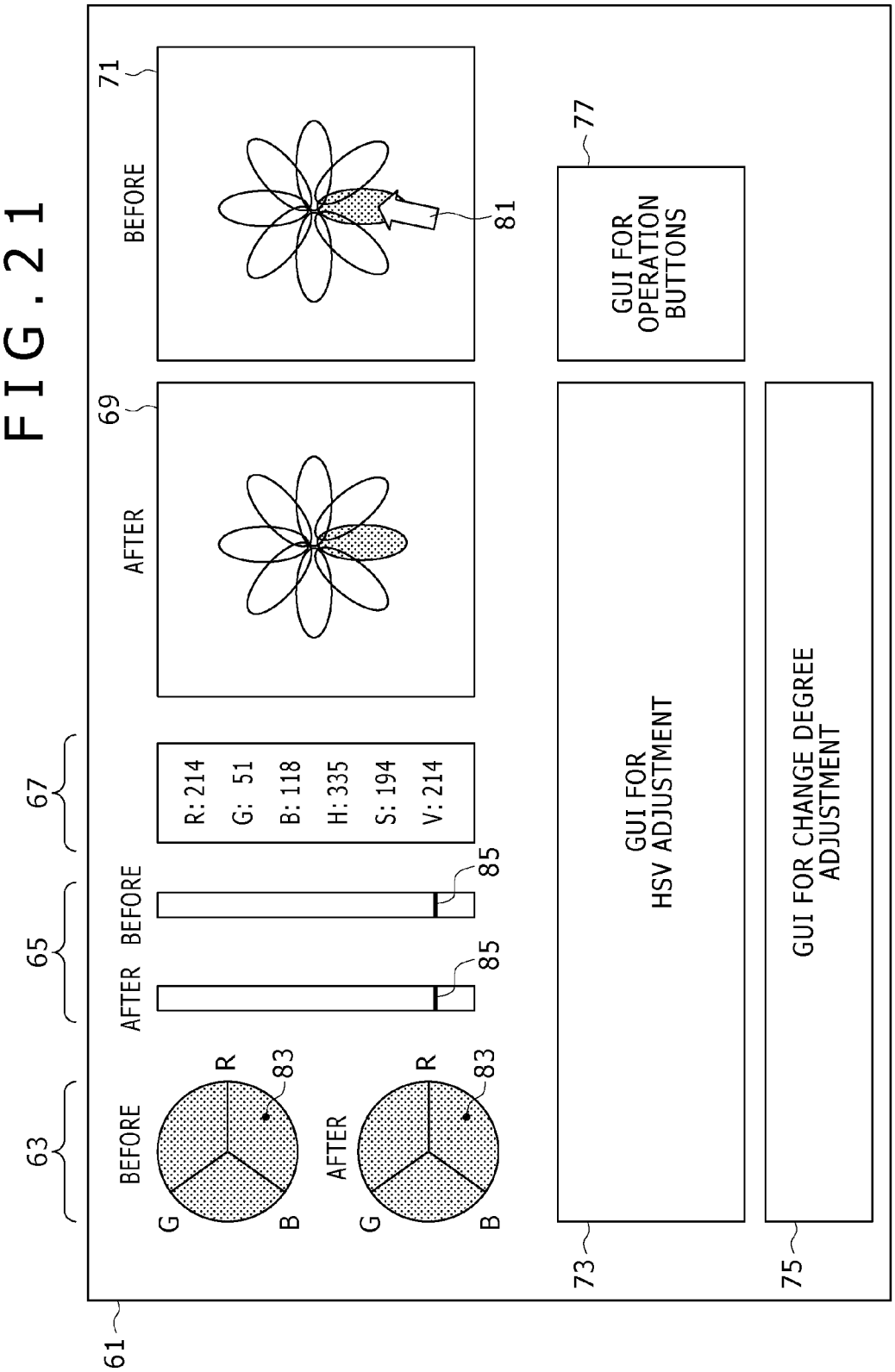

COLOR ADJUSTMENT APPARATUS, DISPLAY APPARATUS, PRINTING APPARATUS, IMAGE PROCESSING APPARATUS, COLOR ADJUSTMENT METHOD, GRAPHICAL USER INTERFACE DISPLAYING METHOD AND PROGRAM

CROSS REFERENCES TO RELATED APPLICATIONS

The present invention contains subject matter related to Japanese Patent Application JP 2005-345060 filed in the Japanese Patent Office on Nov. 30, 2005, the entire contents of which being incorporated herein by reference.

BACKGROUND OF THE INVENTION

1. Field of the Invention

This invention relates to a color adjustment function of an image to be outputted from an outputting apparatus, and more particularly to a color adjustment apparatus, a display apparatus, a printing apparatus, an image processing apparatus, a color adjustment method, a graphical user interface displaying method and a program.

2. Description of the Related Art

The color of an original image and the color of an output image do not sometimes coincide with each other. FIG. 1 illustrates examples of such difference. For example, a blue color of an original image is sometimes visually recognized as a purple color. Similarly, a purple color of an original image is sometimes visually recognized as a magenta color. Such differences are caused by an influence of a color development characteristic or the like unique to the output device.

Various color adjustment techniques for eliminating such color differences as described above are available in related art. One of such color adjustment techniques is disclosed, for example, in Japanese Patent Laid-open No. 2005-175823 or Japanese Patent Laid-open No. 2004-304539.

SUMMARY OF THE INVENTION

However, according to the color adjustment techniques in related art, color adjustment on an editing screen much relies upon the experience or the sixth sense of an editing operator.

Therefore, much time is taken for the color adjustment, and also the adjustment itself does not sometimes proceed smoothly.

Therefore, it is desirable to provide an apparatus and method by which color adjustment on an editing screen can be performed without relying upon the experience or sense of an editing operator.

According to the embodiments of the present invention, three color adjustment techniques are provided.

A. Color Adjustment Technique 1

According to an embodiment of the present invention, there is provided a color adjustment method including the steps of:

(a) storing color information regarding an arbitrary region designated through a pointer in an editing image region; and (b) explicitly displaying a mark, which specifies color coordinates corresponding to the color information, at a pertaining position on a hue ring or a hue bar chart prepared for color adjustment.

B. Color Adjustment Technique 2

According to another embodiment of the present invention, there is provided a color adjustment method including the steps of:

(a) storing color information regarding an arbitrary region designated through a pointer in an editing image region; and (b) explicitly displaying the color information as coordinate values on a color coordinate system given by a phase, a saturation and a lightness.

C. Color Adjustment Technique 3

According to a further embodiment of the present invention, there is provided a color adjustment method, including the steps of:

(a) storing color information regarding an arbitrary region designated through a pointer in an editing image region; and (b) acquiring lightness information of a region designated through the pointer based on the color information and interlocking the display lightness of a hue ring or a hue bar chart to be used for color adjustment of the region with the display lightness given by the lightness information.

The color adjustment techniques 1 to 3 given as the color adjustment methods above can individually be applied to a color adjustment apparatus, a display apparatus, a printing apparatus, an image processing apparatus, a graphical user interface displaying method and a program.

In both of the color adjustment techniques 1 and 2, color information in an arbitrary region designated for color adjustment can be explicitly presented as particular coordinate values of a coordinate system which has coordinate axes of the hue, saturation and lightness to an operator. Where any of the color adjustment techniques 1 and 2 is adopted, the operator can visually confirm the color coordinates and hence can perform color adjustment based on a reasonable foundation.

Meanwhile, in the color adjustment technique 3, an operator can execute color adjustment while confirming the hue ring or the hue bar chart whose lightness is adjusted in an interlocking relationship with the lightness of an arbitrary region designated for color adjustment. Where the color adjustment technique 3 is adopted, an influence of color adjustment can be predicted accurately.

The above and other features and advantages of the present invention will become apparent from the following description and the appended claims, taken in conjunction with the accompanying drawings in which like parts or elements denoted by like reference symbols.

BRIEF DESCRIPTION OF THE DRAWINGS

FIG. 21 is a schematic view showing a screen on which color coordinates of a region designated by an editing image region are displayed explicitly on hue rings and hue bar charts;

DETAILED DESCRIPTION OF THE PREFERRED EMBODIMENTS

In the following, a color adjustment technique to which the present invention is applied is described.

It is to be noted that, to matters which are not specifically described herein or not specifically illustrated in the accompanying drawings, well-known or publicly known techniques in the pertaining technical field are applied.

A. Medical Printing System

Figures 1, 2:
FIG. 1 is a view illustrating several examples wherein the color of an original image and the color of an output image do not coincide with each other.
FIG. 2 is a block diagram showing an example of a configuration of a medical printing system.

FIG. 2 shows an example of a configuration of a medical printing system. Referring to FIG. 2, the printing system includes a computer 1 for image editing and a printing apparatus 3 for medical image printing. A printing action of the printing system proceeds generally in a processing procedure described below.

First, image data are read out from an image memory of the printing apparatus 3 into the computer 1, and color adjustment by an operator is executed on the computer 1. After the color adjustment is completed, image data after the color adjustment are transmitted from the computer 1 to the printing apparatus 3. The printing apparatus 3 prints the received image data on paper or some other recording medium.

B. Adoption of Color Adjustment in HSV Space

For color adjustment of image data, generally a method of adjusting an R (red) component, a G (green) component and a B (blue) component independently of each other is adopted.

However, the method of adjusting an R component, a G component and a B component independently of each other is not intuitive to the human being. Further, where the adjustment screen includes a gray scale image, the color adjustment of a chromatic color image makes a factor of coloring the gray scale image.

Therefore, the inventor of the present invention adopts a technique of converting image data in RGB space (space defined by red, green and blue) into image data in HSV space (space defined by the hue, saturation and lightness) and applying color adjustment in the HSV space.

Figure 3:
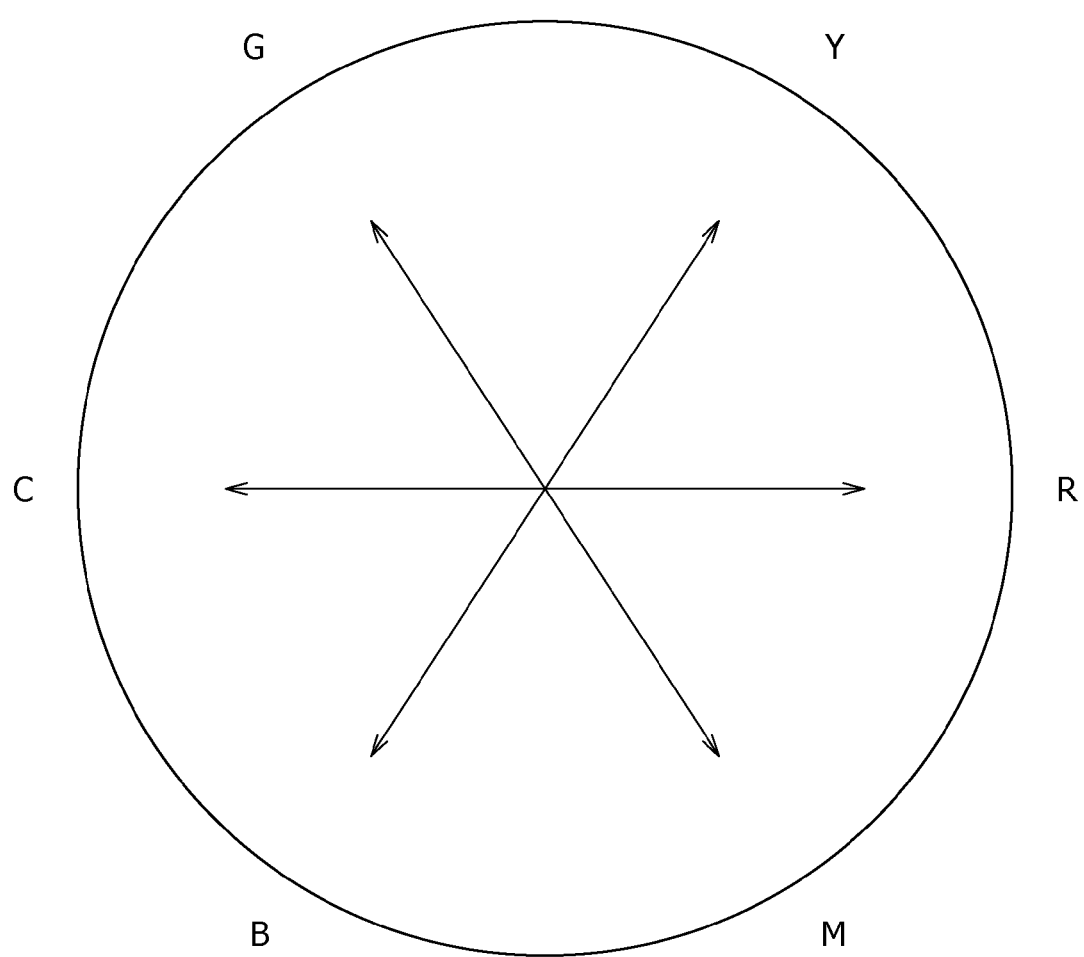
FIG. 3 is a diagrammatic view illustrating an example of a concept of a hue ring.

FIG. 3 illustrates an example of a concept of a hue ring wherein attention is paid to the hue in HSV space. FIG. 3 illustrates a phase relationship of representative colors used in a display system or a printing system, that is, a phase relationship of R (red), G (green), B (blue), C (cyan), M (magenta) and Y (yellow).

As seen from FIG. 3, the phase relationship of the colors coincides with the color sensation of the human being, and a reproduced color can be adjusted by rotation of the hue. For example, it can be seen that, where it is intended to intensify the yellow of an image portion reproduced in green, the hue should be rotated to the right side, that is, clockwise in FIG. 3.

However, a technique of rotating the hue uniformly has an influence also on the other colors. Therefore, adjustment of one color sometimes makes a cause of general degradation of the picture quality or of the necessity for further adjustment.

Therefore, in the following description, a technique for adjusting a color independently within a particular phase range in a case wherein it is applied to a printing system is described. It is to be noted that the color adjustment technique described has been proposed by the inventor of the present invention and has been applied for patent already.

Further, the color adjustment in HSV space is advantageous for adjustment where an adjustment object image includes a color image and a gray scale image. This is because the color adjustment in HSV space does not have an influence on the gray scale image at all. In other words, the color balance is not deteriorated, and therefore, upon color adjustment, the gray scale image is not colored.

C. Example of an Apparatus

C-1. Example of a computer

Figure 4:
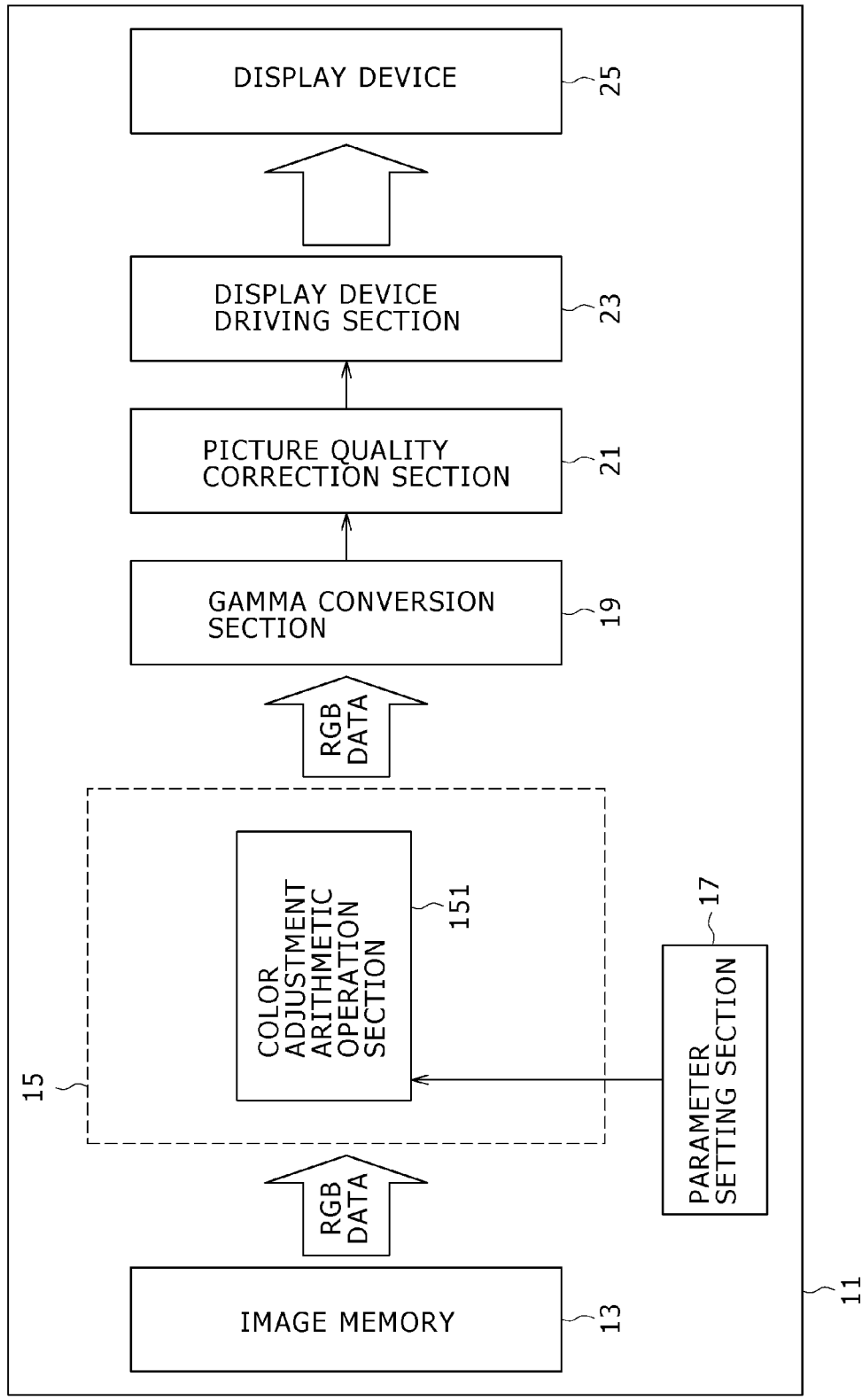
FIG. 4 is a block diagram showing an example of a configuration of a computer which incorporates a color adjustment apparatus which executes a color adjustment process in HSV space.

FIG. 4 shows an example of a functional configuration of a computer 11 which executes the color adjustment function in HSV space. It is to be noted that the computer 11 has a known hardware configuration including a microprocessor, a storage apparatus, inputting and outputting apparatus and so forth.

The computer 11 includes, as functioning blocks thereof, an image memory 13, a digital signal processing section 15, a parameter setting section 17, a gamma conversion section 19, a picture quality correction section 21, a display device driving section 23 and a display device 25.

The image memory 13 is a storage apparatus for temporarily storing image data read out from the printing apparatus 3. Although a semiconductor memory is used here, also it is possible to use a hard disk apparatus or some other magnetic recording apparatus or other storage apparatus. It is to be noted that image data are given as RGB data.

The digital signal processing section 15 implements a conversion process of RGB data into HSV data, a color adjustment process in HSV space and a conversion process of HSV data into RGB data by an arithmetic operation process. It is to be noted that the digital signal processing section 15 is generally formed from a microprocessor and executes various application programs.

The digital signal processing section 15 where it is executing an application program for such a color adjustment process as mentioned above is hereinafter referred to as color adjustment arithmetic operation section 151. It can be expected that the method of implementing the color adjustment process by an arithmetic operation process of the digital signal processing section 15 in this manner can achieve a high arithmetic operation accuracy. However, also it is possible to implement an equivalent function using a reference table for exclusive use or using some other hardware as in the case of an example of a configuration of the printing apparatus 3 hereinafter described.

The parameter setting section 17 is a processing device for setting a color adjustment parameter corresponding to the substance of color adjustment to be executed in HSV space.

It is to be noted that, as such a color adjustment parameter as mentioned above, four parameters are used including a hue, a saturation, a lightness and a degree of change within a designated phase range. The color adjustment parameters are specified through a GUI (graphical user interface) hereinafter described.

Figure 5:
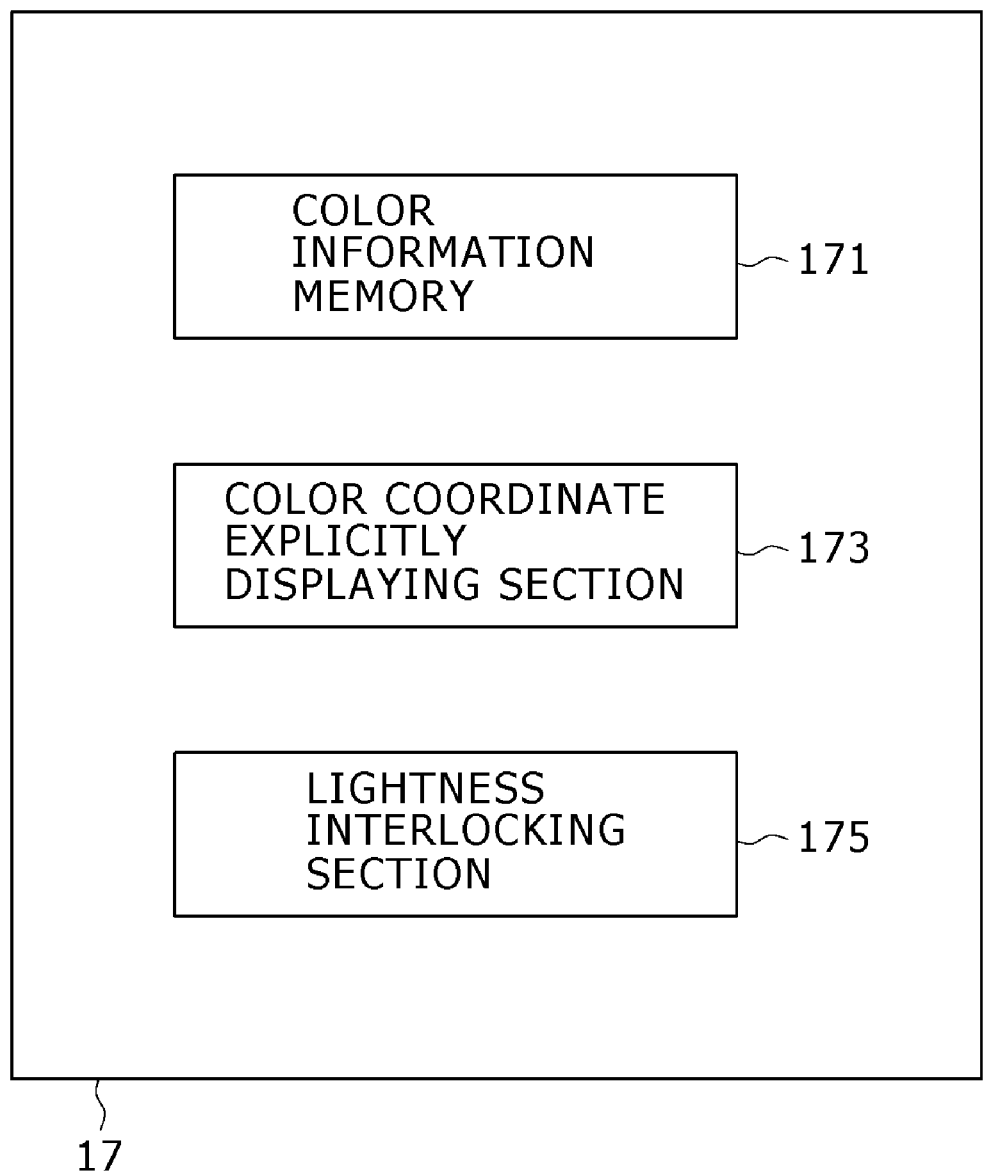
FIG. 5 is a block diagram illustrating an example of a functional configuration of a parameter setting section shown in FIG. 4.

FIG. 5 shows a functional configuration of the parameter setting section 17. Referring to FIG. 5, the parameter setting section 17 shown includes a color information memory 171, a color coordinate explicitly displaying section 173, and a lightness interlocking section 175.

The color information memory 171 is a storage region for storing color information regarding an arbitrary region designated through a pointer within an editing image region. Similarly to the image memory 13 described hereinabove, a semiconductor memory, a hard disk apparatus or the like is used for the color information memory 171. It is to be noted that, in the editing image region, an image before the color adjustment and another image after the color adjustment read out from the image memory 13 are displayed.

The color coordinate explicitly displaying section 173 is a processing device for implementing a process of explicitly displaying a mark for specifying color coordinates corresponding to color information at pertaining positions of a hue ring and a hue bar chart prepared for color adjustment and another process for explicitly displaying the color information as coordinate values on a color coordinate system given by the hue, saturation and lightness. Thanks to the processing functions, the operator can visually confirm the coordinate values and perform color adjustment based on a reasonable foundation.

It is to be noted that the hue ring and the hue bar chart are displayed on a screen same as the editing image region. Particular examples are hereinafter described in connection with examples of a GUI hereinafter described.

The lightness interlocking section 175 is a processing device which executes a process of acquiring lightness information of a region designated by a pointer based on color information and interlocking the display lightness of the hue ring and the hue bar chart used for color adjustment of the region with the display lightness of the designated region. By this processing function, the operator can execute a color adjustment operation while confirming the actual color.

Also interlocking in the display lightness between the hue ring and the hue bar chart by this function is hereinafter described in connection with examples of a GUI.

The gamma conversion section 19 is a processing device which performs an input-output conversion so that an image reproduced through an outputting device may exhibit a linear gradation. In the case of the present example, the gamma conversion section 19 executes such a conversion process as to cancel a gamma characteristic unique to the display device 25.

The picture quality correction section 21 is a processing device which executes contour correction and some other known correction processes for improving the picture quality.

The display device driving section 23 is a processing device which executes controlling action necessary to drive the display device 25 such as, for example, horizontal scanning driving and vertical scanning driving.

The display device 25 is formed from a liquid crystal panel, a plasma display panel, an FED (Field Emission Display) panel or some other flat display panel, a Braun tube, a projector or some other device.

C-2. Printing Apparatus Example 1

Figure 6:
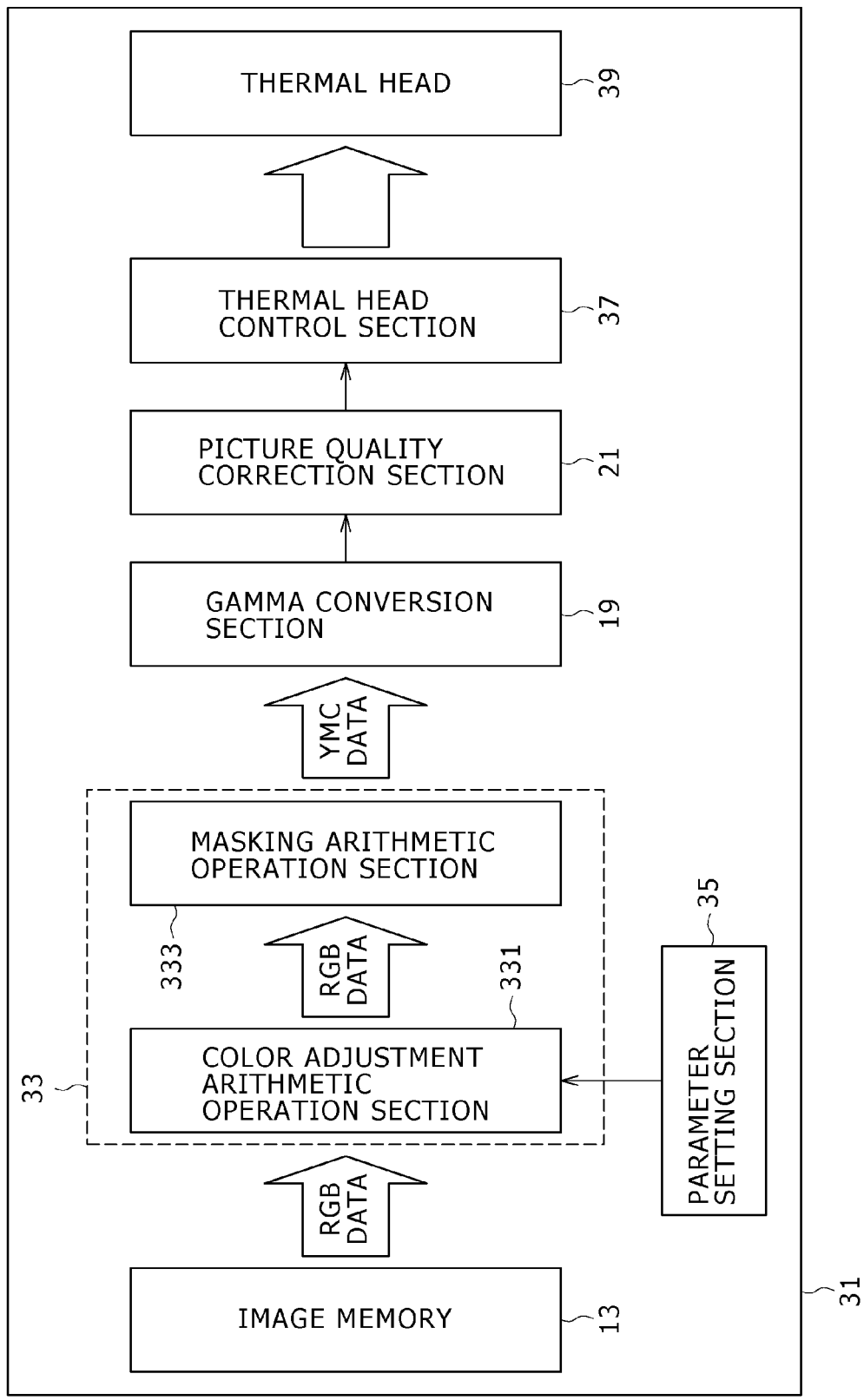
FIG. 6 is a block diagram showing an example of a printing apparatus where a color adjustment process in HSV space is executed as a signal process of a microprocessor.

FIG. 6 shows an example of a configuration of a printing apparatus 31 which incorporates a color adjustment apparatus which executes the color adjustment process in HSV space. In the example, the color adjustment in HSV space is executed by the computer 1. However, the following description of an example of an internal configuration is given under the assumption that a function which can execute a similar color adjustment process is incorporated also in the printing apparatus 31.

Referring to FIG. 6, the printing apparatus 31 shown includes an image memory 13, a digital signal processing section 33, a parameter setting section 35, a gamma conversion section 19, a picture quality correction section 21, a thermal head control section 37, and a thermal head 39.

FIG. 6 shows the printing apparatus 31 formed as a thermal printer. It is to be noted that the color adjustment technique proposed in the present application can be applied also to an ink jet printer and a laser printer. The printing apparatus 31 actually includes a system control section not shown as well.

The image memory 13 is a storage device for temporarily storing image data inputted for printing. Also in this instance, a semiconductor memory is used for the image memory 13. However, also a hard disk apparatus, some other magnetic storage apparatus or other storage apparatus can be used. It is to be noted that the image data are given as RGB data.

The digital signal processing section 33 is a processing device which implements color adjustment and a conversion process into YMC (yellow-magenta-cyan) data by an arithmetic operation process. For example, the digital signal processing section 33 is implemented using a microprocessor.

The digital signal processing section 33 includes a color adjustment arithmetic operation section 331 and a masking arithmetic operation section 333.

The color adjustment arithmetic operation section 331 of the digital signal processing section 33 corresponds to an arithmetic operation process for executing the color adjustment in HSV space. The arithmetic operation process executed by the color adjustment arithmetic operation section 331 includes a process of converting RGB data into HSV data, a color adjustment process for the HSV data after the data conversion, and a process of converting the HSV data after the color adjustment into RGB data.

The masking arithmetic operation section 333 corresponds to an arithmetic operation of converting RGB data into YMC data suitable for printing.

It is anticipated that the method of implementing a color adjustment process by an arithmetic operation process of the digital signal processing section 33 can achieve a high degree of arithmetic operation accuracy if the processing device (microprocessor) has a sufficiently high arithmetic operation speed.

The parameter setting section 35 is a processing device which sets color adjustment parameters corresponding to the substance of color adjustment to be executed in HSV space. Also in this instance, the four parameters including the hue, saturation, lightness and degree of change within a designated phase range are used as the color adjustment parameters. In the present example of the printing apparatus 31, the parameters are supplied to the printing apparatus 31 from the computer 1.

The gamma conversion section 19 is a processing device which performs an input-output conversion so that an image produced through a thermal head may exhibit a linear gradation. In the present example, the gamma conversion section 19 executes such a conversion process as to cancel the gamma characteristic unique to the thermal head.

The picture quality correction section 21 is a processing device which executes contour correction and a known correction process of improving the picture quality such as the sharpness and so forth.

The thermal head control section 37 is a processing device which executes controlling action necessary to drive the thermal head 39 such as, for example, a supplying action of current to a heat generating element.

The thermal head 39 is a device on which heat generating elements are disposed over the printing width. For printing of a color image, an ink film formed by applying a sublimable material to a film is used.

C-3. Printing Apparatus Example 2

For reference, another example of a configuration which can be adopted as the printing apparatus 3 is described.

Figure 7:
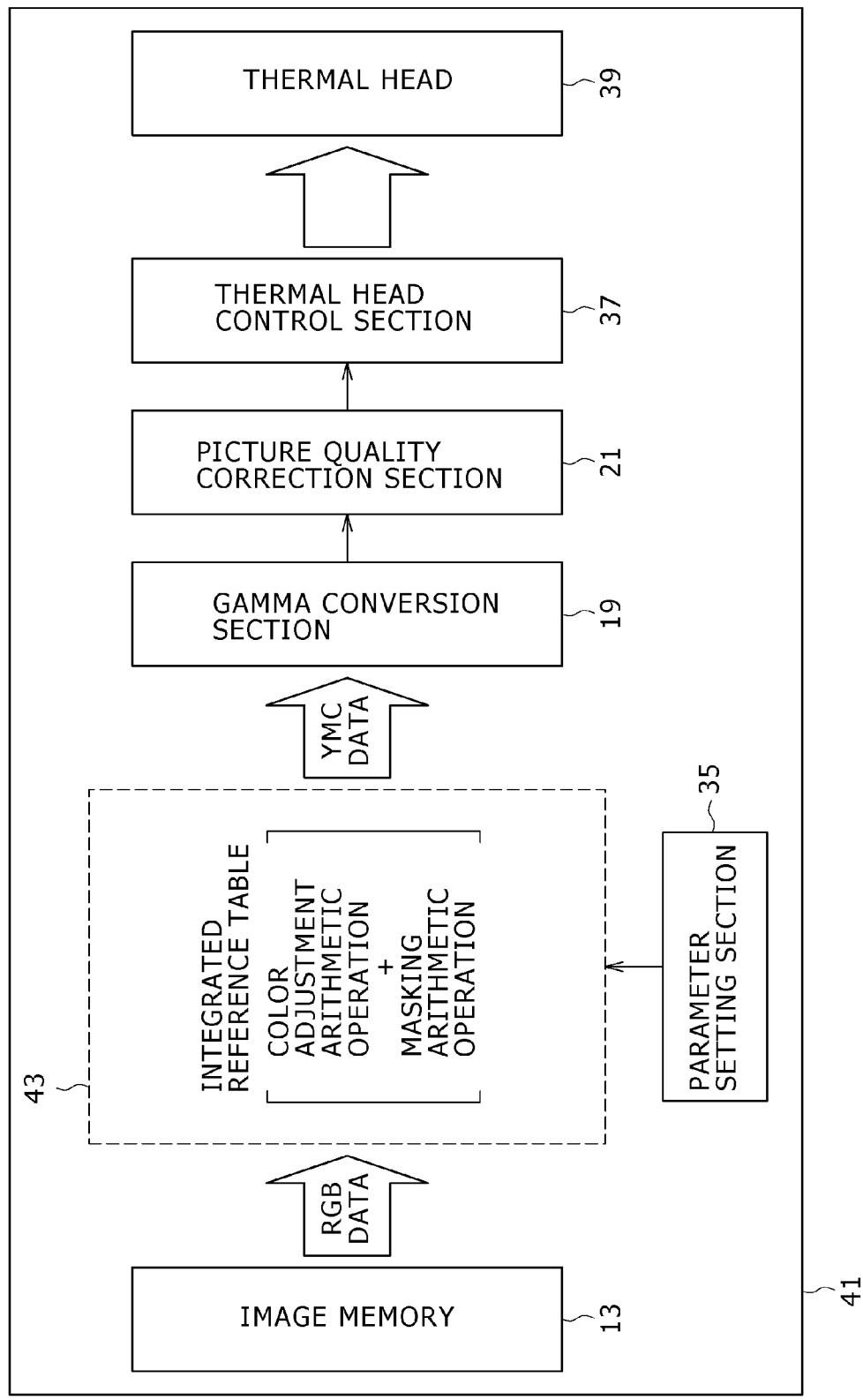
FIG. 7 is a block diagram showing an example of a printing apparatus where a color adjustment process in HSV space is implemented using a lookup table.

While the configuration example of the printing apparatus 3 described above with reference to FIG. 6 implements the color adjustment process by an arithmetic operation process by means of a microprocessor, the configuration example of FIG. 7 implements the color adjustment process using a lookup table.

FIG. 7 shows an example of a configuration of a printing apparatus 41 which uses a lookup table.

Referring to FIG. 7, the printing apparatus 41 includes an image memory 13, an integrated reference table 43, a parameter setting section 35, a gamma conversion section 19, a picture quality correction section 21, a thermal head control section 37, and a thermal head 39.

The integrated reference table 43 is a lookup table in which an input-output relationship wherein the color adjustment arithmetic operation section 331 and the masking arithmetic operation section 333 shown in FIG. 6 are integrated is registered.

The lookup table is formed, for example, from a ROM, a RAM or some other storage device. The advantage where a lookup table is used is that the processing speed is high and less expensive implementation can be anticipated. However, a production step of calculating the input-output relationship to produce a lookup table in advance is required. It is to be noted that the integrated reference table 43 is used to convert RGB data into YMC data.

D. Substance of the Color Adjustment

First, the substance of the color adjustment executed in HSV space is described particularly.

In the present example, color adjustment functions are executed independently of each other with regard to the hue, saturation, lightness and change. It is to be noted that a function of interlocking the display lightness of a hue ring and a hue bar chart in a screen for image editing with the display lightness of a region indicated by a pointer and another function of explicitly displaying position coordinates corresponding to the designated region are hereinafter described.

D-1. Hue

First, a function of adjusting the hue independently in HSV space is described.

Figure 8A:
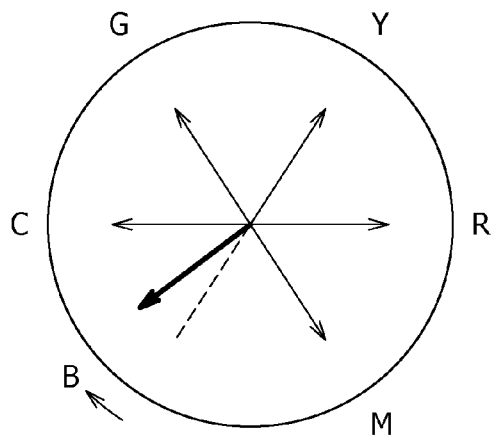
FIGS. 8A, 8B and 8C are diagrammatic views illustrating a technique for adjusting the hue independently with regard to six phase axes.
Figure 8B:
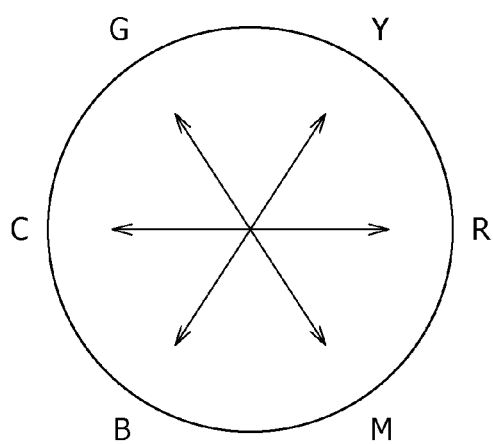
Figure 8C:
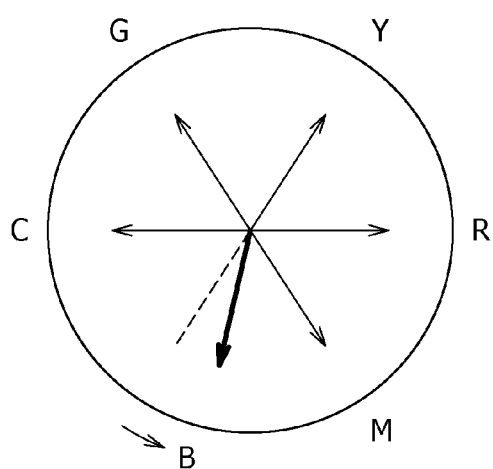

In the present example, six phase axes of R, G, B, C, M and Y are defined as seen in FIGS. 8A to 8C, and the hue is adjusted independently for each axis.

A non-adjusted phase state is illustrated in FIG. 8B.

An example of adjustment of the B axis toward the C axis is illustrated in FIG. 8A. In this instance, the color change between the C axis and the B axis and the color change between the B axis and the M axis are altered. However, the other colors, that is, the colors from the C axis to the M axis in the clockwise direction are not influenced by the adjustment. In particular, the reproduction ratio of colors corresponding to the interval between the C axis and the B axis decreases while the reproduction ratio of colors corresponding to the interval between the B axis and the M axis increases.

Meanwhile, FIG. 8C illustrates an example of adjustment of the B axis toward the M axis. Also in this instance, the color change between the C axis and the B axis and the color change between the B axis and the M axis are altered. However, the other colors, that is, the colors from the C axis to the M axis in the clockwise direction are not influenced by the adjustment. In particular, the reproduction ratio of colors corresponding to the interval between the C axis and the B axis increases while the reproduction ratio of colors corresponding to the interval between the B axis and the M axis decreases.

In this manner, it is possible to adjust only a particular color.

It is to be noted that the phase axes to be defined need not be the six colors described hereinabove. Theoretically, it is possible to define arbitrary color phase axes such as an orange color axis or a purple color axis. If phase axes are defined arbitrarily, then the phase of an arbitrarily noticed color and the phase of another color can be adjusted independently of each other.

Incidentally, since a hue is an angle component, where the R, G, B, C, M and Y axis are defined, they are defined at intervals of 60° (FIG. 6).

Figure 9:
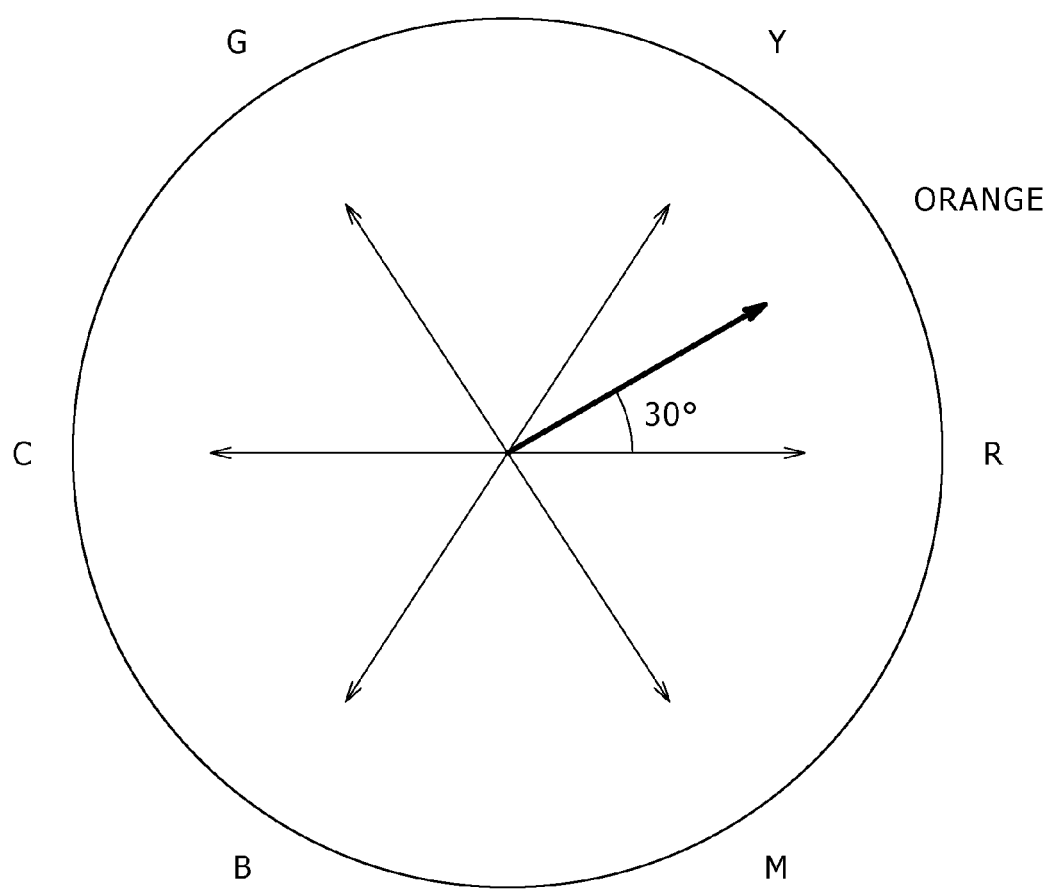
FIG. 9 is a diagrammatic view illustrating a phase relationship where a phase axis for an orange color is added.

Accordingly, where an orange color is defined for a new phase axis, the orange color should be defined at a portion proximate to approximately 30°. FIG. 9 illustrates a hue ring in which an orange color is set as a phase axis for adjustment. In the hue ring shown in FIG. 9, since the phase axis corresponding to the orange color is defined, the range in which phase adjustment can be performed can be defined more restrictively. For example, where phase axes which may be an object of adjustment are provided at intervals of 60°, the range within which the adjustment has an influence is 120°. However, where the phase axis of the orange color is added, the range within which the adjustment of the phase axis has an influence can be restricted to 60° between the Y axis and the R axis.

Further, the range of influence of phase adjustment of the Y axis or the M axis can be restricted to a range of 90° between the G axis and the orange color axis or between the M axis and the orange color axis.

By adding a phase axis arbitrarily in this manner, it is possible to restrict the color range, in which the color is influenced by adjustment of a phase axis, only to a particular color. As a result, a higher adjustment effect than that by the techniques in related art can be anticipated.

It is a matter of course that the phase adjustment can be performed for one phase axis and also for a plurality of phase axes simultaneously. Naturally, the direction of adjustment can be set independently for each phase axis. Also it is possible to set an arbitrary group of phase axes.

D-2. Saturation

Now, a function of adjusting the saturation independently in HSV space is described.

Figure 10A:
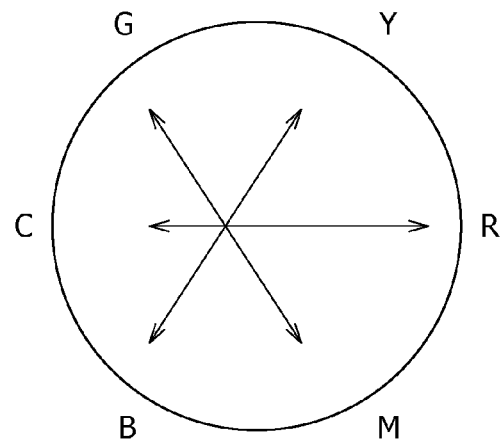
FIGS. 10A, 10B and 10C are diagrammatic views illustrating a technique for adjusting the saturation independently with regard to six phase axes.
Figure 10B:
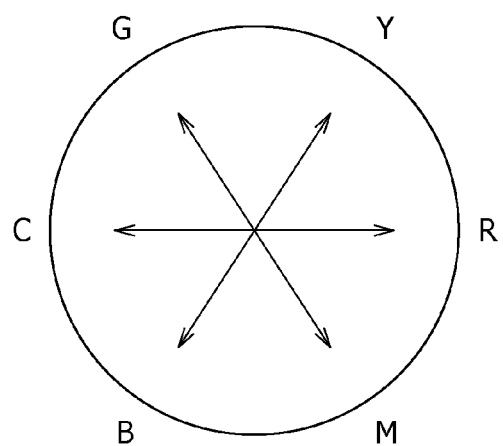
Figure 10C:
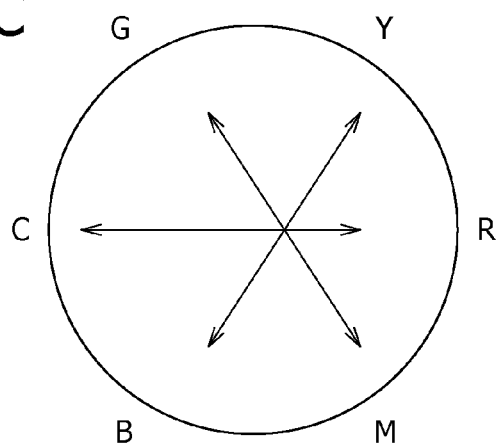

Also here, six phase axes of R, G, B, C, M and Y are defined as seen in FIGS. 10A to 10C, and the saturation is adjusted independently for each axis.

A non-adjusted saturation state is illustrated in FIG. 10B.

FIG. 10A illustrates an example of adjustment of the saturation where it is intended to decrease the vividness of C (cyan) but increase the vividness of R (red). In this instance, no significant change is provided to the saturation of G (green), Y (yellow), B (blue) or M (magenta). Therefore, color adjustment which reflects an intention of the user can be achieved.

FIG. 10C illustrates an example of adjustment of the saturation where it is intended to decrease the vividness of R (red) but increase the vividness of C (cyan). Also in this instance, no significant alteration is provided to the saturation of G (green), Y (yellow), B (blue) or M (magenta). Therefore, color adjustment which reflects an intention of the user can be achieved.

It is to be noted that, also in this instance, if a phase axis is added arbitrarily or an arbitrary group of phase axes is set, then the range within which the color is influenced by the saturation adjustment can be restricted to a particular phase range.

D-3. Lightness

Now, a function of adjusting the lightness independently in HSV space is described.

Also here, six phase axes of R, G, B, C, M and Y are defined, and the lightness is adjusted independently for each axis.

Figure 11A:
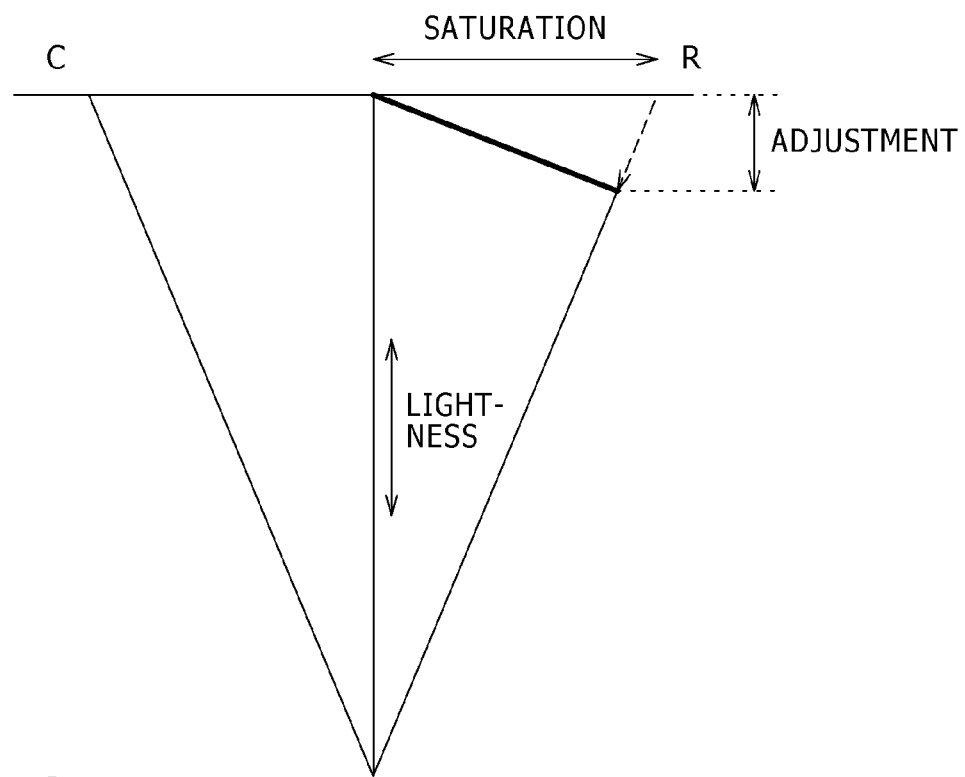
FIGS. 11A and 11B are diagrammatic views illustrating a technique for adjusting the lightness independently with regard to six phase axes.
Figure 11B:
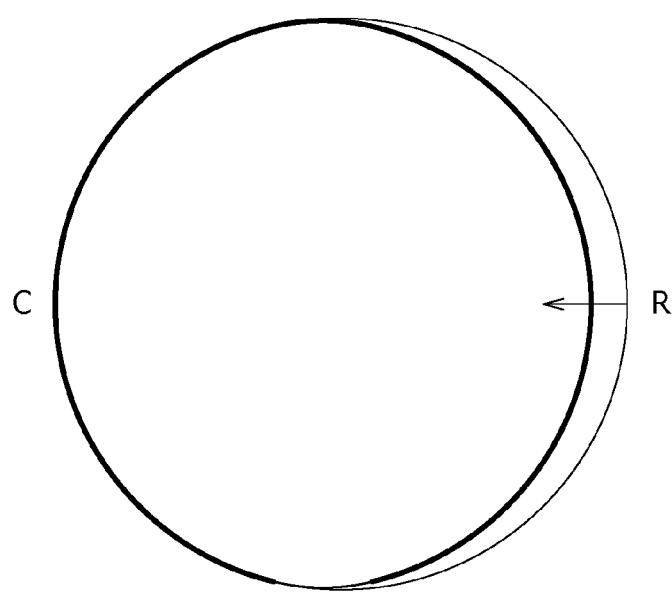

FIG. 11A illustrates an example wherein the lightness of the R (red) color is decreased independently. As seen in FIG. 11A, the lightness in the R (red) axis direction is decreased while the lightness of an achromatic portion (gray scale portion) corresponding to the central position of the hue ring is fixed. It can be seen that also the saturation of the R color decreases (the color becomes thinner) together with the decrease of the lightness. In FIG. 11B, the saturation before the lightness is adjusted is indicated by a thin line, and the saturation after the lightness is adjusted is indicated by a thick line.

Figure 12A:
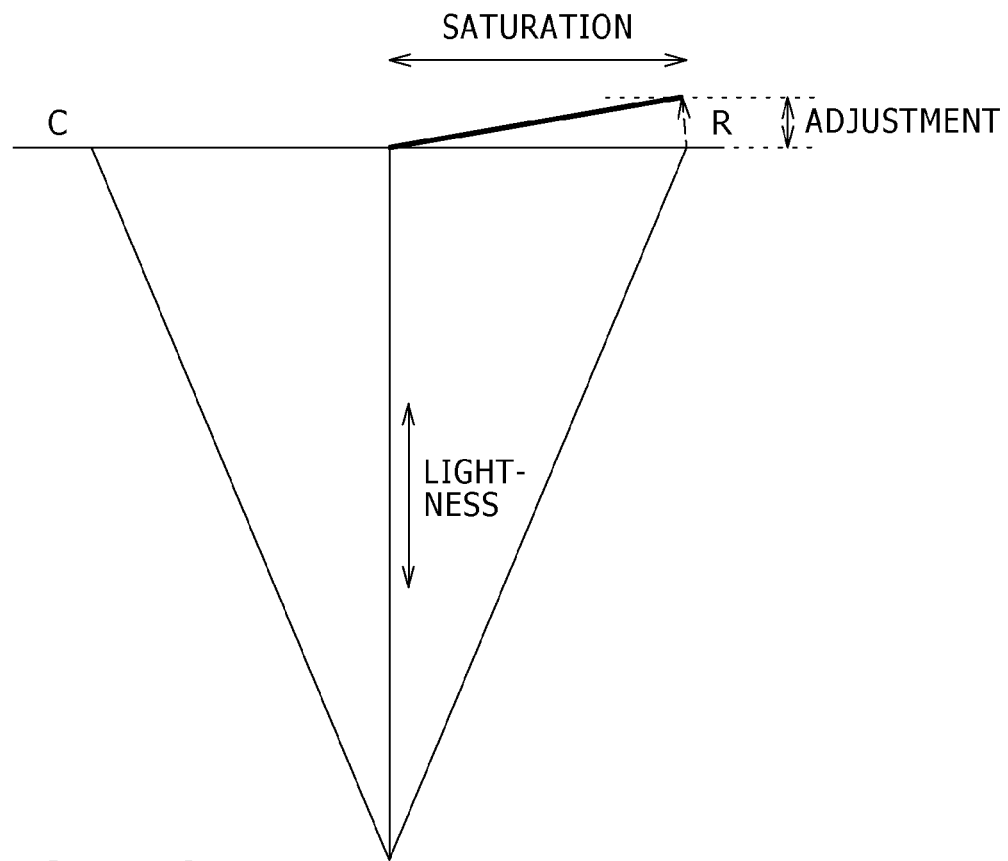
FIGS. 12A and 12B are diagrammatic views illustrating another technique for adjusting the lightness independently with regard to six phase axes.

In contrast, also it is possible to raise only the lightness of the R (red) color. FIG. 12A illustrates an example of this. As seen in FIG. 12A, the lightness in the R (red) axis direction is increased while the lightness of an achromatic portion (gray scale portion) corresponding to the central position of the hue ring is fixed. It can be seen that also the saturation of the R color increases (the color becomes thicker) together with the increase of the lightness.

Figure 12B:
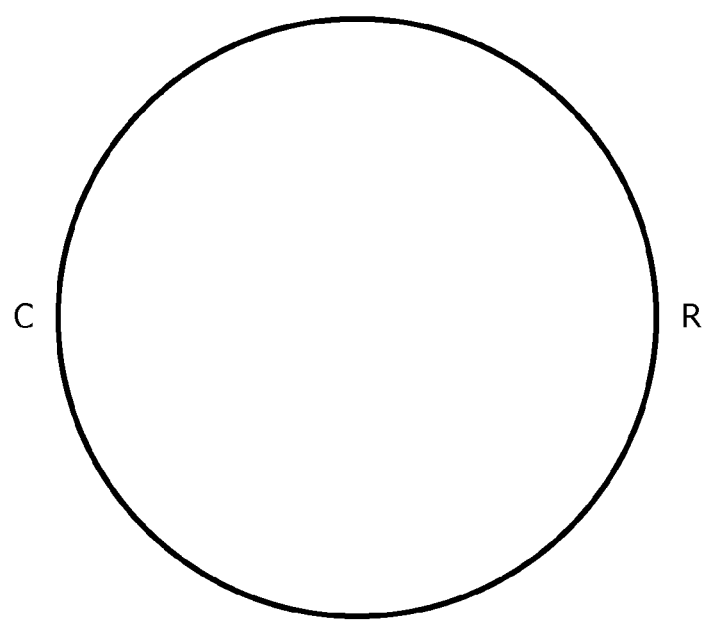

In FIG. 12B, the saturation before the lightness is adjusted is indicated by a thin line, and the saturation after the lightness is adjusted is indicated by a thick line.

Naturally, also in this instance, if a phase axis is added arbitrarily or an arbitrary set of phase axes is set, then the range within which the color is influenced by the adjustment of the lightness can be restricted to a particular phase range.

D-4. Degree of the Change

In actual color adjustment, some color may not be adjusted by adjustment of the parameters of the hue, saturation and lightness. For example, it is sometimes said that, where a medical image is printed, "B (blue) on a display screen looks M (magenta)". This phenomenon occurs because changeover from B (blue) to M (magenta) on the hue ring proceeds quickly. In other words, the phenomenon arises from the fact that the degree of the change in color is different from that by a sense of the human being.

Figure 13:
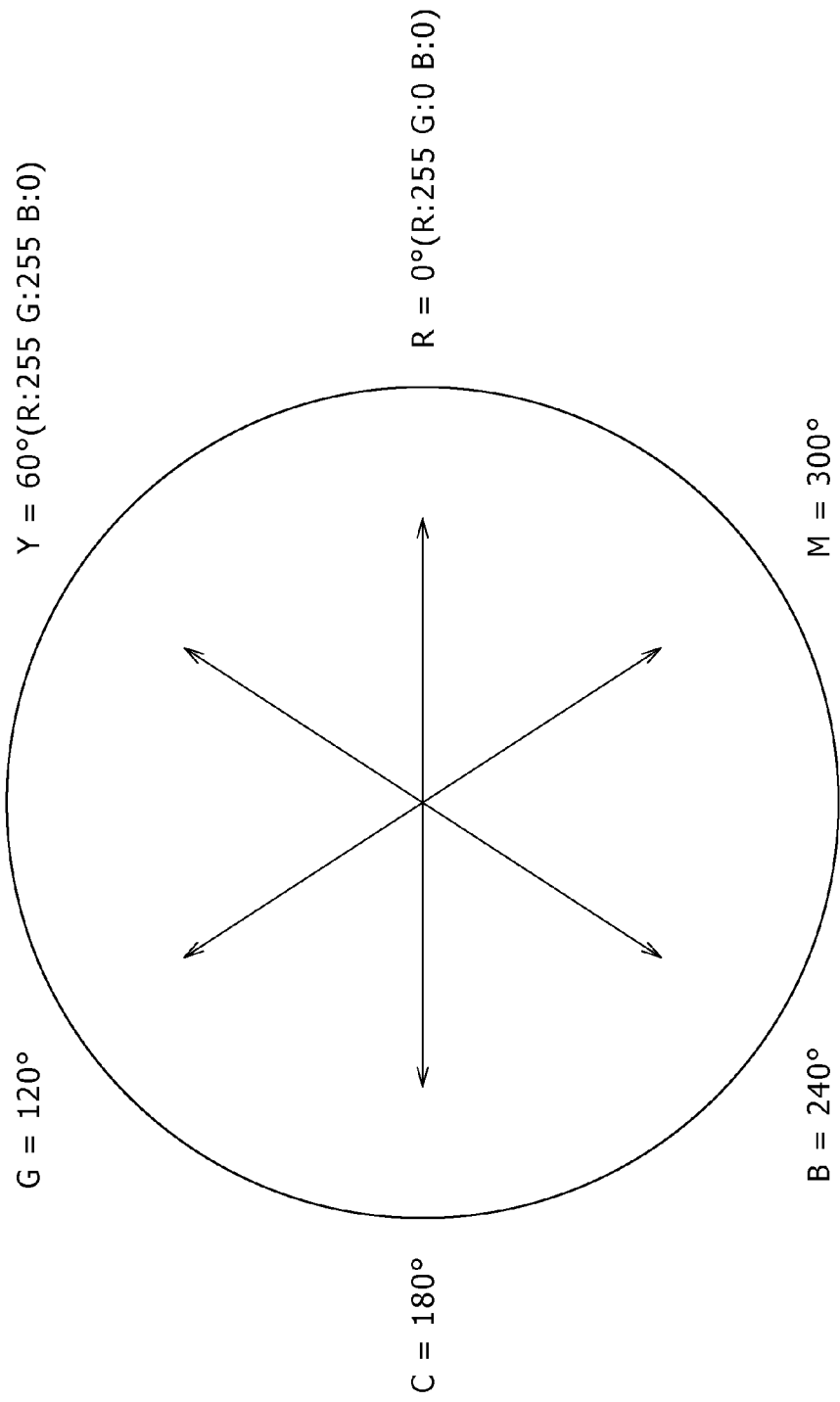
FIG. 13 is a diagrammatic view illustrating a phase relationship of six phase axes.
Figure 14A:
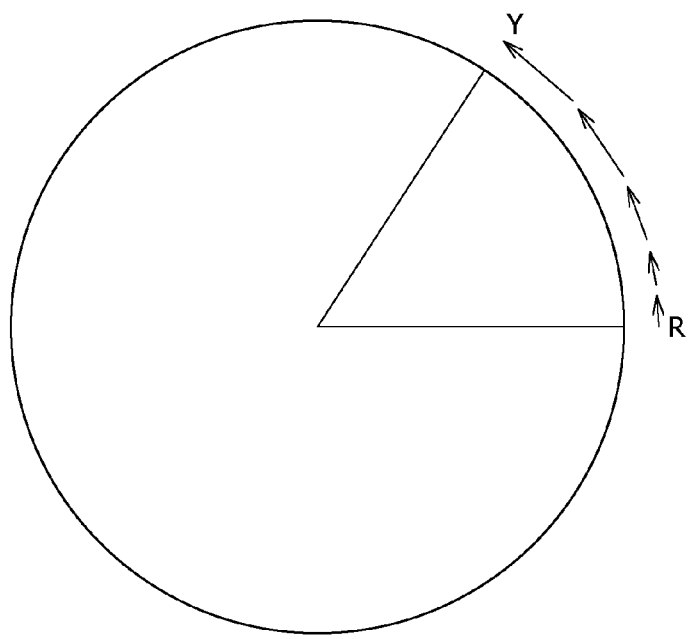
FIGS. 14A and 14B are diagrammatic views illustrating a principle of adjustment of the degree of change of a color defined between adjacent phase axes.
Figure 14B:
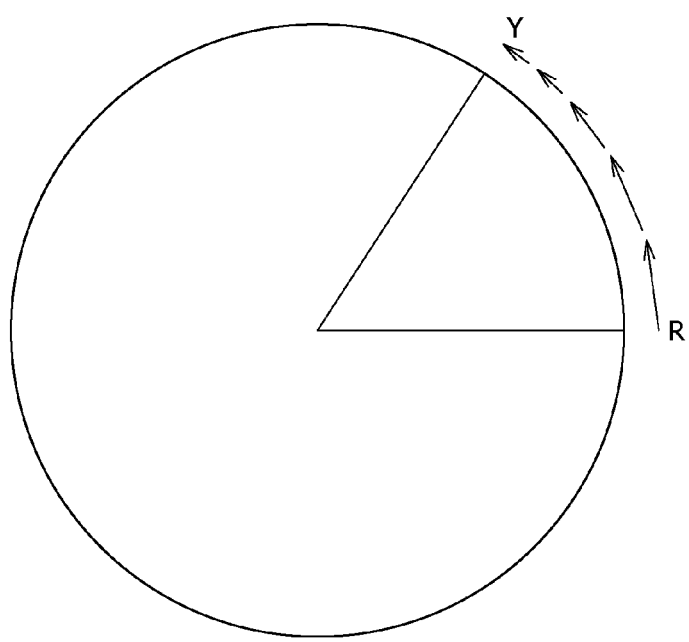

The inventor of the present invention proposes a mechanism for adjusting the degree of change in color between adjacent colors regarding the six colors of R (red), G (green), B (blue), C (cyan), M (magenta) and Y (yellow) illustrated in FIG. 13.

Where description is given taking a change from R (red) to Y (yellow) as an example, the color adjustment is control of the change between "whether the changeover from R (red) to Y (yellow) is slow" as seen in FIG. 14A or "whether the color changes immediately from R (red) to Y (yellow)" as seen in FIG. 14B.

It is to be noted that each arrow mark in FIGS. 14A and 14B represents a speed of the change in color. As the length of the arrow mark increases, the speed in change increases, and as the length of the arrow mark decreases, the speed in change decreases.

Naturally, where six phase axes are defined, intervals between adjacent colors are formed including that of R (red)-Y (yellow) and also those of Y (yellow)-G (green), G (green)-C (cyan), C (cyan)-B (blue), B (blue)-M (magenta) and M (magenta)-R (red).

Also in this instance, the number of phase axes which provide adjustment ranges is not limited to six, but it is possible to add an arbitrary phase axis to produce a new interval between adjacent colors.

It is to be noted that the degree of change in color can be adjusted in accordance with the following principle.

Also here, description is given taking a change from R (red) to Y (yellow) as an example. In this instance, where color data is represented by 8 bits, the change from R to Y can be represented as a change of the phase from 0° to 60°.

Thereupon, RGB data changes from R=(R: 255, G: 0, B: 0) to Y=(R: 255, G: 255, B: 0).

Figure 15A:
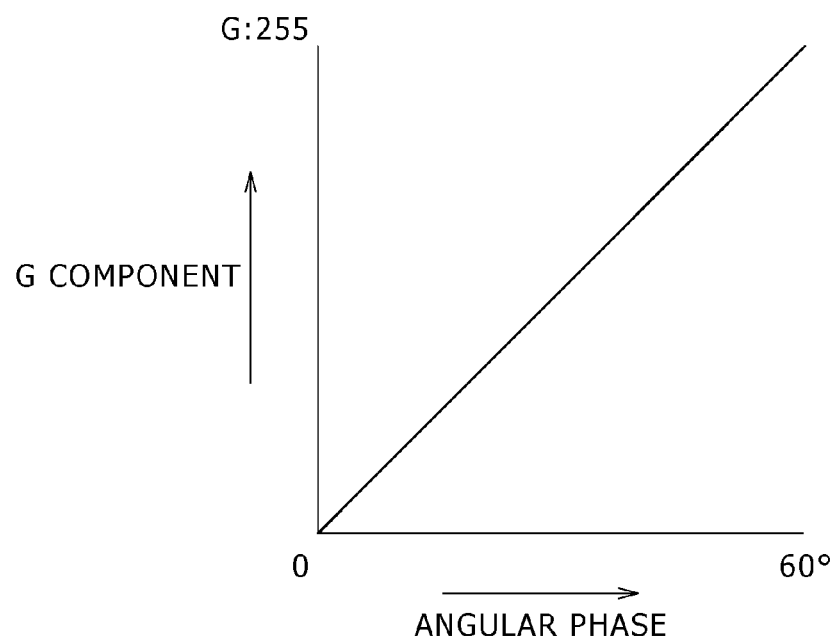
FIGS. 15A and 15B are diagrammatic views illustrating a technique for decelerating the degree of change of a color.
Figure 16A:
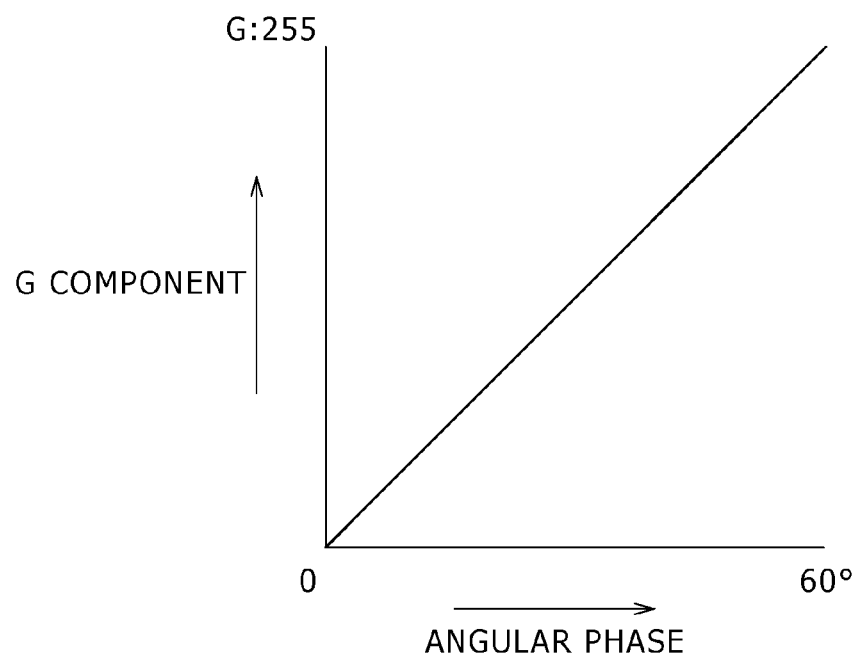
FIGS. 16A and 16B are diagrammatic views illustrating a technique for accelerating the degree of change of a color.

FIGS. 15A and 16A illustrate manners of the component change where the degree of change is not adjusted. As seen from FIGS. 15A and 16A, only the G component changes linearly from G: 0 to G: 255.

Therefore, the inventor of the present invention proposes a technique of adjusting the relationship nonlinearly to control the degree of change.

Figure 15B:
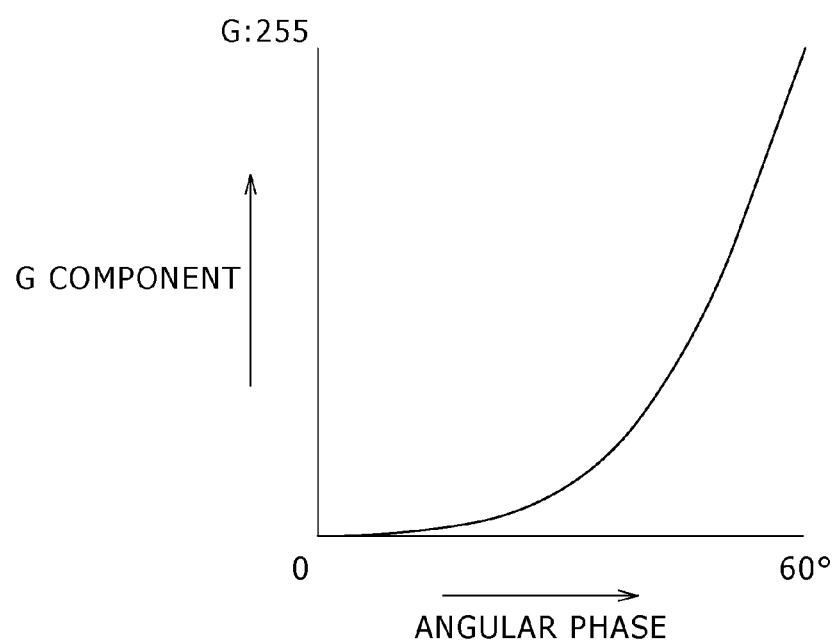

For example, if the increasing rate of the G component within the range from 0° to 30° is set comparatively low while the increasing rate of the G component is set comparatively high within the range from 30° to 60° as seen in FIG. 15B, then an effect that the degree of change of the color from R (red) to Y (yellow) is decelerated can be anticipated.

On the other hand, if the increasing rate of the G component within the range from 0° to 30° is set comparatively high while the increasing rate of the G component is set comparatively low within the range from 30° to 60° as seen in FIG.

16B, then an effect that the degree of change of the color from R (red) to Y (yellow) is accelerated can be anticipated.

It is to be noted that, where the adjustment of the degree of change is combined with the adjustment of the hue, saturation or lightness, there is the possibility that the hue may be changed already by the adjustment of the hue or the like.

In this instance, the technique described above may be applied assuming that, where the phase of the R component after the change is represented by $\alpha°$ and the phase of the Y component after the change is represented by $\beta°$, if the phase changes from $\alpha°$ to $\beta°$, then only the G component varies linearly from G: 0 to G: 255.

Naturally, also in this instance, if a phase axis is added arbitrarily or an arbitrary set of phase axes is set, then the range of influence by the adjustment of the degree of color change can be restricted to a particular phase.

Figure 17A:
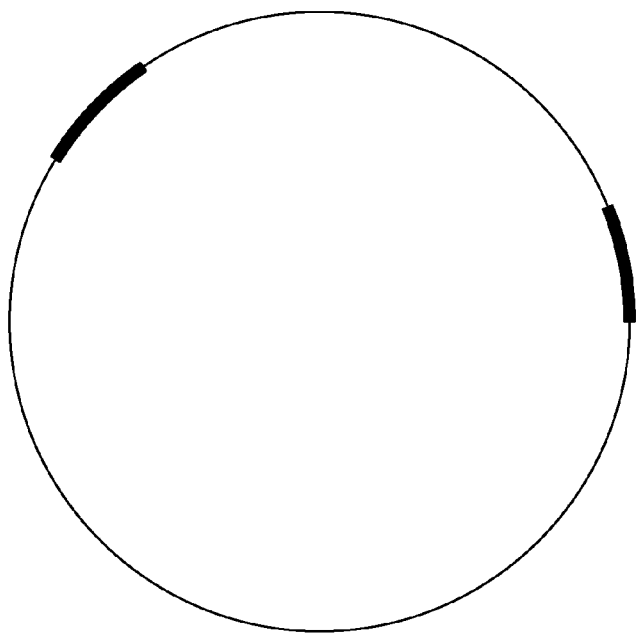
FIGS. 17A and 17B are diagrammatic views illustrating examples of a phase range in which the degree of change of a color is adjusted independently with regard to different colors.
Figure 17B:
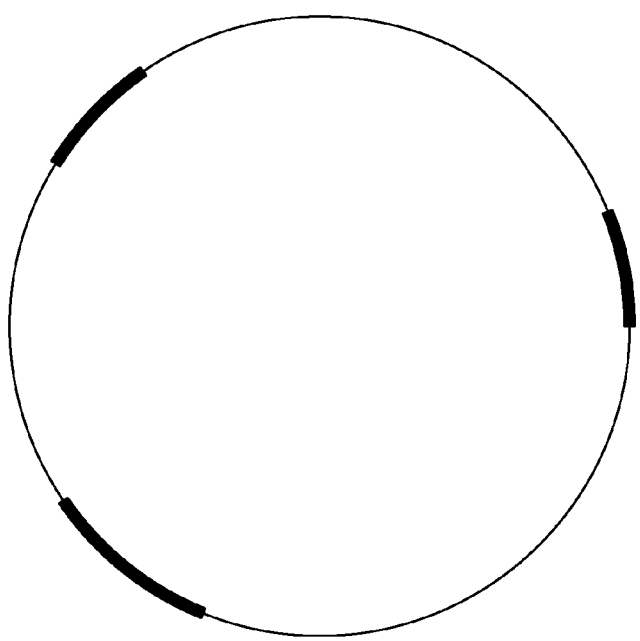

Also it is possible to designate a plurality of phase axes (phase ranges) simultaneously as seen in FIG. 17A or 17B and adjust the degree of color change separately for the individual phase axes.

FIG. 17A illustrates adjustment of the degree of color change with regard to two ranges on a phase ring. Meanwhile, FIG. 17B illustrates adjustment of the degree of color change with regard to three ranges on a phase ring.

Figure 18:
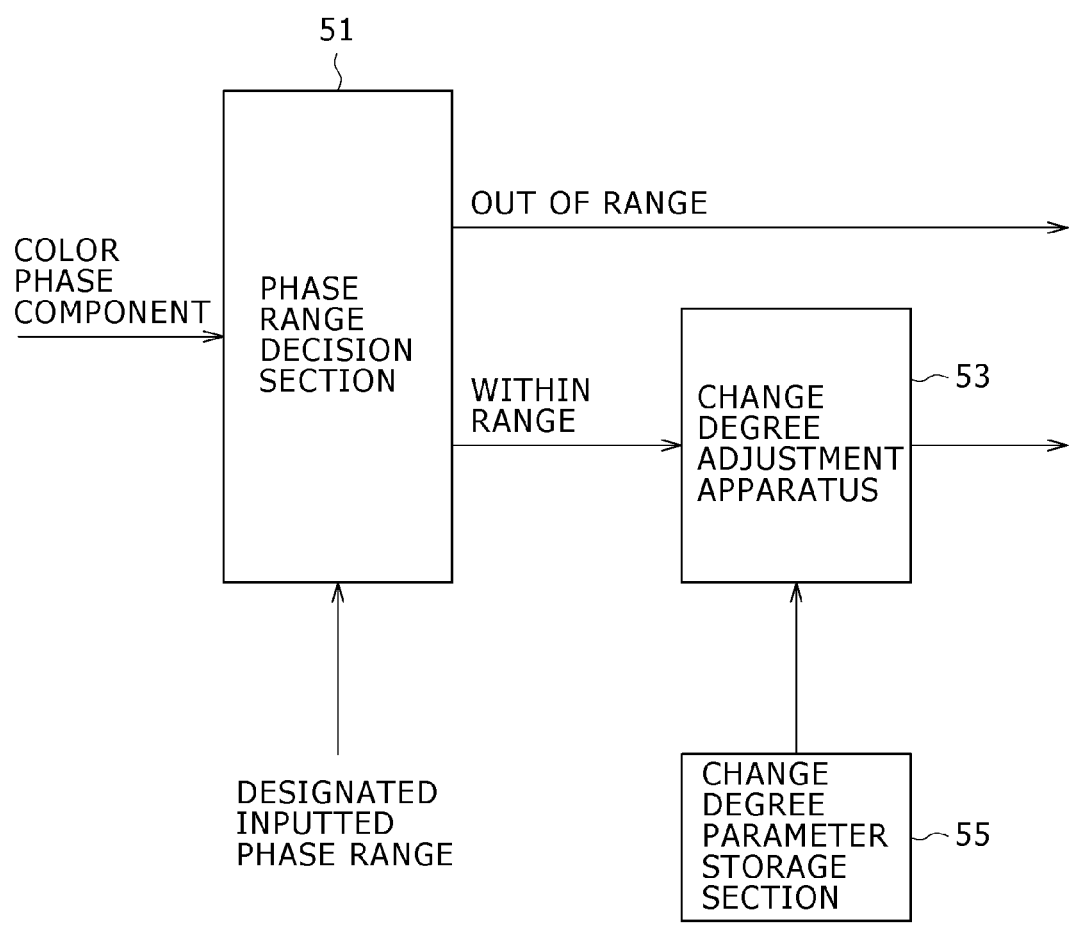
FIG. 18 is a block diagram showing an example of a system configuration used in the color adjustment process.

Incidentally, in order to actually adjust the degree of color change, such a system configuration or arithmetic operation procedure as shown in FIG. 18 may be adopted.

Referring to FIG. 18, a phase range decision section 51 first decides whether or not a color component of input image data is included within a phase range designated by the user. If it is decided that the phase component of the input image data is not included in the designated phase range, then the input image data is passed as it is to a succeeding process without adjusting the degree of change of the same.

On the other hand, if the color component of the input image data is included in the designated phase range, then the inputted color component is supplied to a change degree adjustment apparatus 53, by which the degree of color change is adjusted as described hereinabove. Then, resulting image data is passed to the succeeding process. Thereupon, a parameter representative of the degree of change is received from a change degree parameter storage section 55. Setting of the parameter to the change degree parameter storage section 55 is executed through a GUI hereinafter described.

Figure 16B:
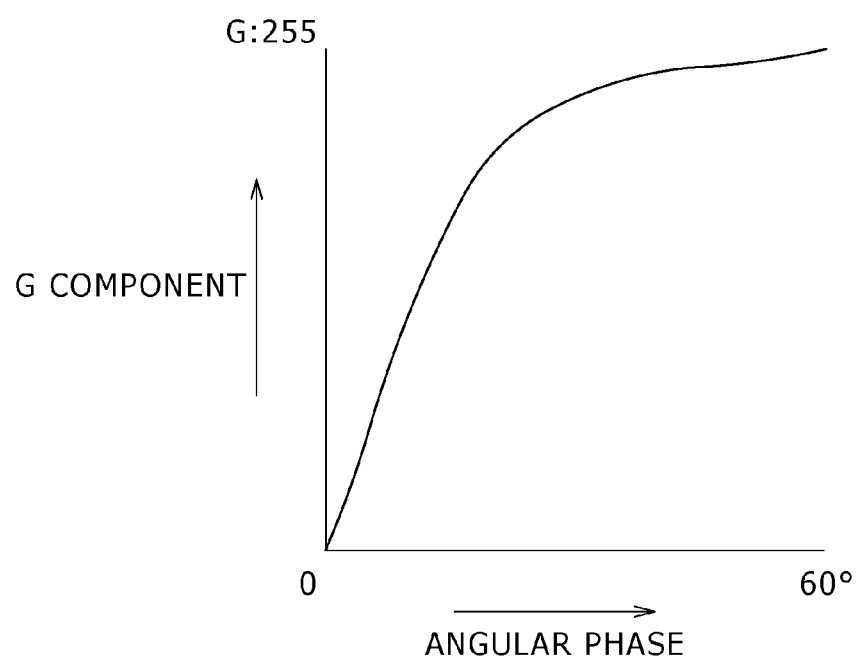

Here, the input-output relationship to be used for the adjustment of the degree of color change may be given as a function which defines the nonlinear quadratic curve shown in FIG. 15B or 16B. However, the process is facilitated if the input-output relationship is determined by calculation or selection of a lookup table using a mechanism described below.

Figure 19:
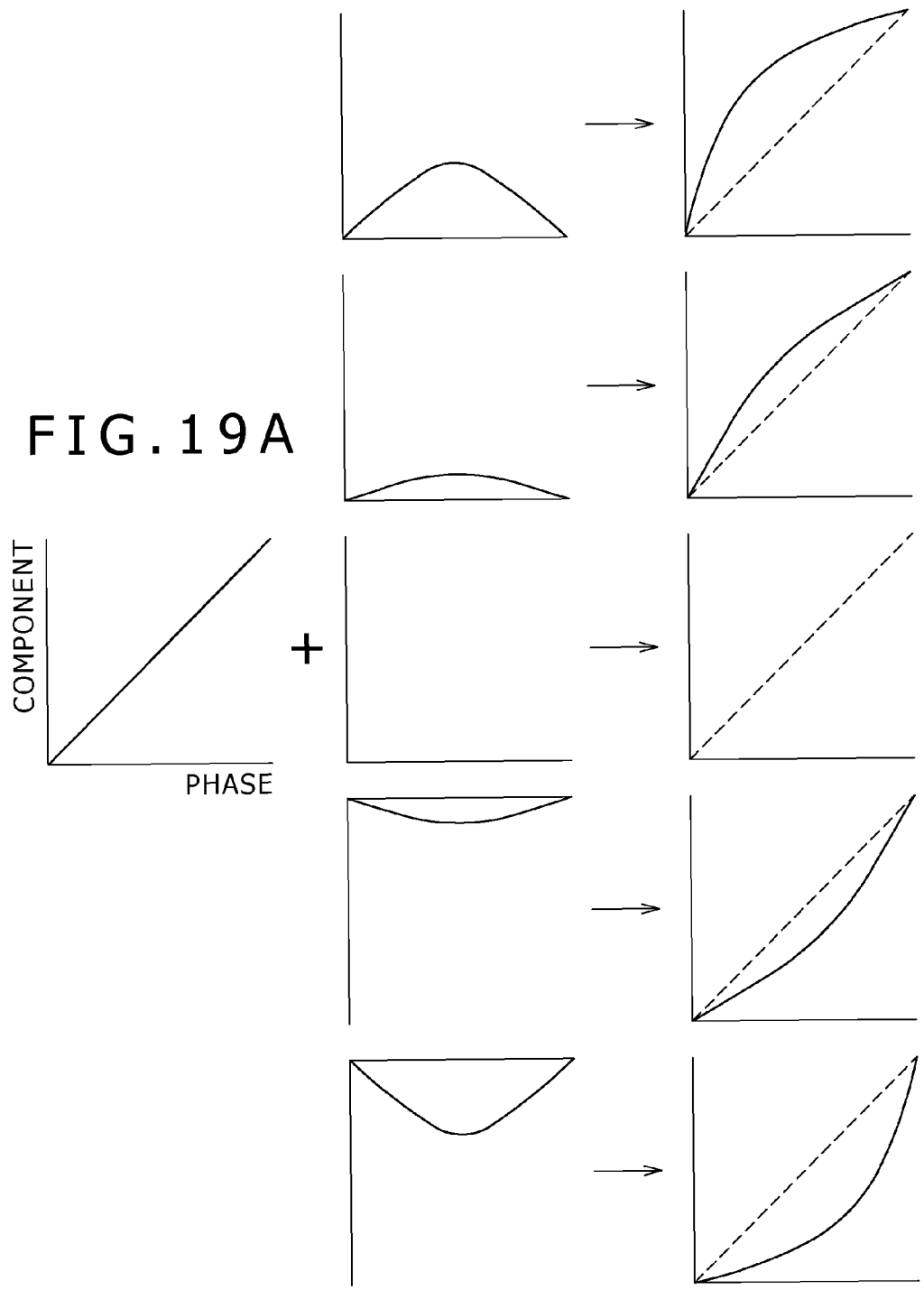
FIGS. 19A, 19B and 19C are diagrammatic views illustrating an example of a method of determining an input-output relationship suitable for adjustment of the degree of color change simply and readily.

FIGS. 19A to 19C illustrate a method which provides an input-output relationship suitable for adjustment of the degree of color change simply and readily.

FIG. 19A illustrates an input-output relationship before the degree of color change is adjusted. In this instance, the relationship between the phase and the phase varies linearly.

FIG. 19B illustrates sine curves for adjustment prepared in order to adjust the degree of color change. A curve at a comparatively higher location in FIG. 19B exhibits a waveform having a comparatively great amplitude on the positive side and provides an effect of accelerating the color change. On the other hand, a curve at a comparatively low location in FIG. 19B exhibits a waveform having a comparatively great amplitude on the negative side and provides another effect of decelerating the color change.

If that one of the sine waves which has an amplitude increased or decreased to the positive side or the negative side in response to a degree of change indicated by the user is used, then color adjustment can be performed in accordance with the intention of the user.

FIG. 19C illustrates input-output relationships where the input-output relationships illustrated in FIGS. 19A and 19B are synthesized.

E. Example of a GUI for Color Adjustment

Figure 20:
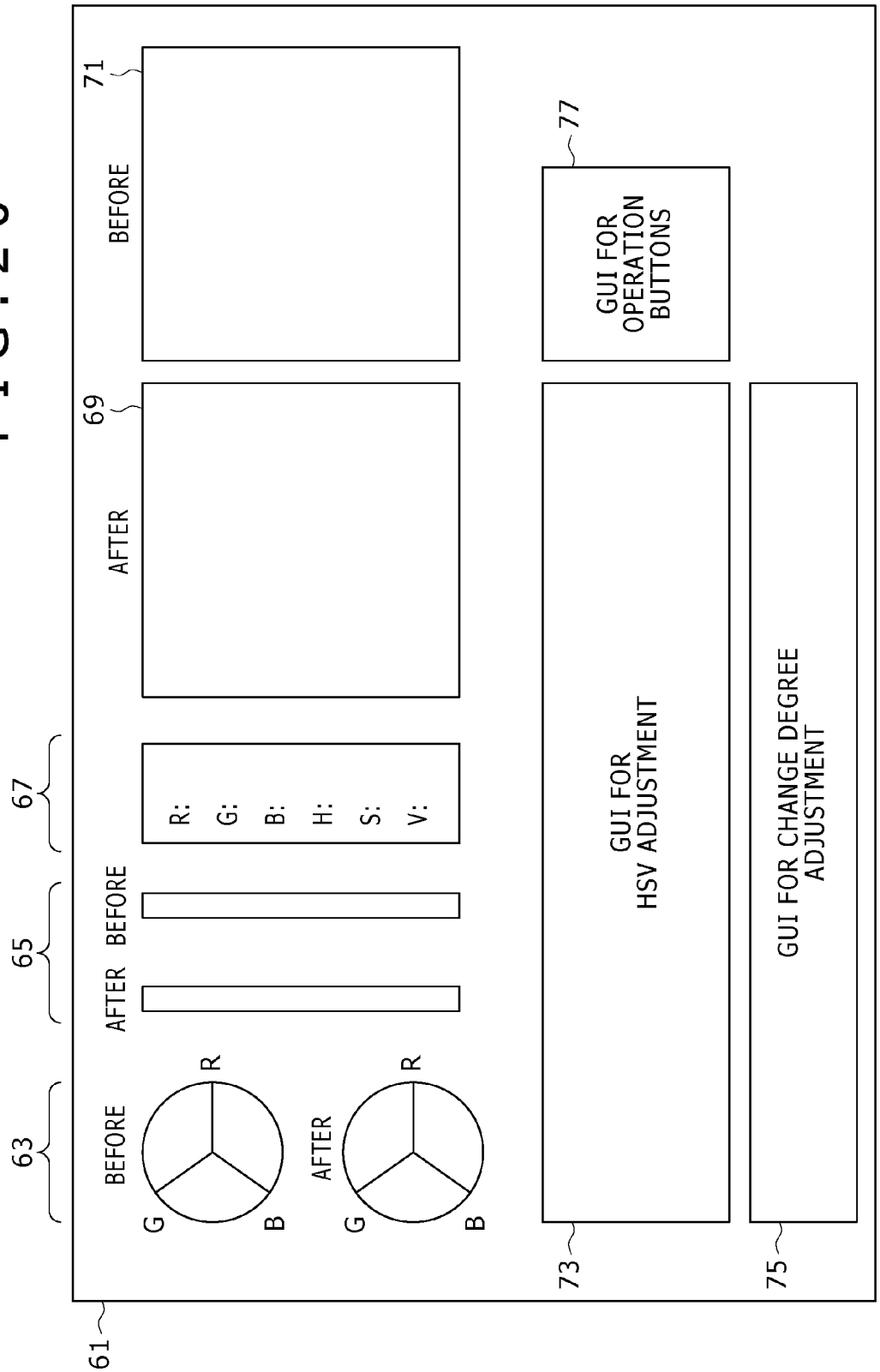
FIG. 20 is a schematic view showing an example of a GUI for color adjustment.

FIG. 20 shows an example of a display screen of a GUI (Graphical User Interface) suitable to adjust the four adjustment factors described hereinabove, that is, the hue, saturation, lightness and degree of change, independently of each other.

It is to be noted that the GUI is implemented as a function of the parameter setting section 17.

An adjustment screen 61 shown in FIG. 20 includes display places 63, 65, 67, 69 and 71 to be used to confirm the colors before and after adjustment through contrast and display places 73, 75 and 77 used for instruction of color adjustment.

The display place 63 is used to display phase rings before and after adjustment. The display place 65 is used to display hue bar charts obtained by developing the phase rings before and after adjustment into bars. The display places 63 and 65 are used where the user wants to purely confirm the phase change in color distribution irrespective of an image of an object of adjustment.

The display place 67 is used to display color coordinate information (RGB coordinates and HSV coordinates) in an arbitrary image region designated using a pointer or the like on the display place 69 or 71 as an editing image region in the form of numerical values. It is to be noted that, in FIG. 20, R represents an R value; G a G value; B a B value; H a phase; S a saturation; and V a lightness.

The display place 69 is used as an editing image region to display an actual image after color adjustment, and the display place 71 is used as an editing image region to display an actual image before adjustment. From the display places 69 and 71, an effect of adjustment of an actual image can confirmed through contract.

The display place 73 is used to display a GUI for adjustment in HSV space, and the display place 75 is used to display a GUI for change degree adjustment. Further, the display place 77 is used to display a GUI for operation buttons.

First, an interlocking function between the display places 69 and 71 and the display places 63 and 65 is described. In other words, an interlocking function between the editing image regions and the hue rings and hue bar charts is described.

FIG. 21 shows an example of a display of the adjustment screen 61 implemented by the interlocking function. Referring to FIG. 21, a color position corresponding to color information (RGB coordinate values) in a region designated arbitrarily by an operator through a pointer 81 from within an image (original image) prior to adjustment is displayed explicitly as a dark round mark 83 in the corresponding hue ring and a horizontal bar 85 in the corresponding hue bar chart.

Figure 24:
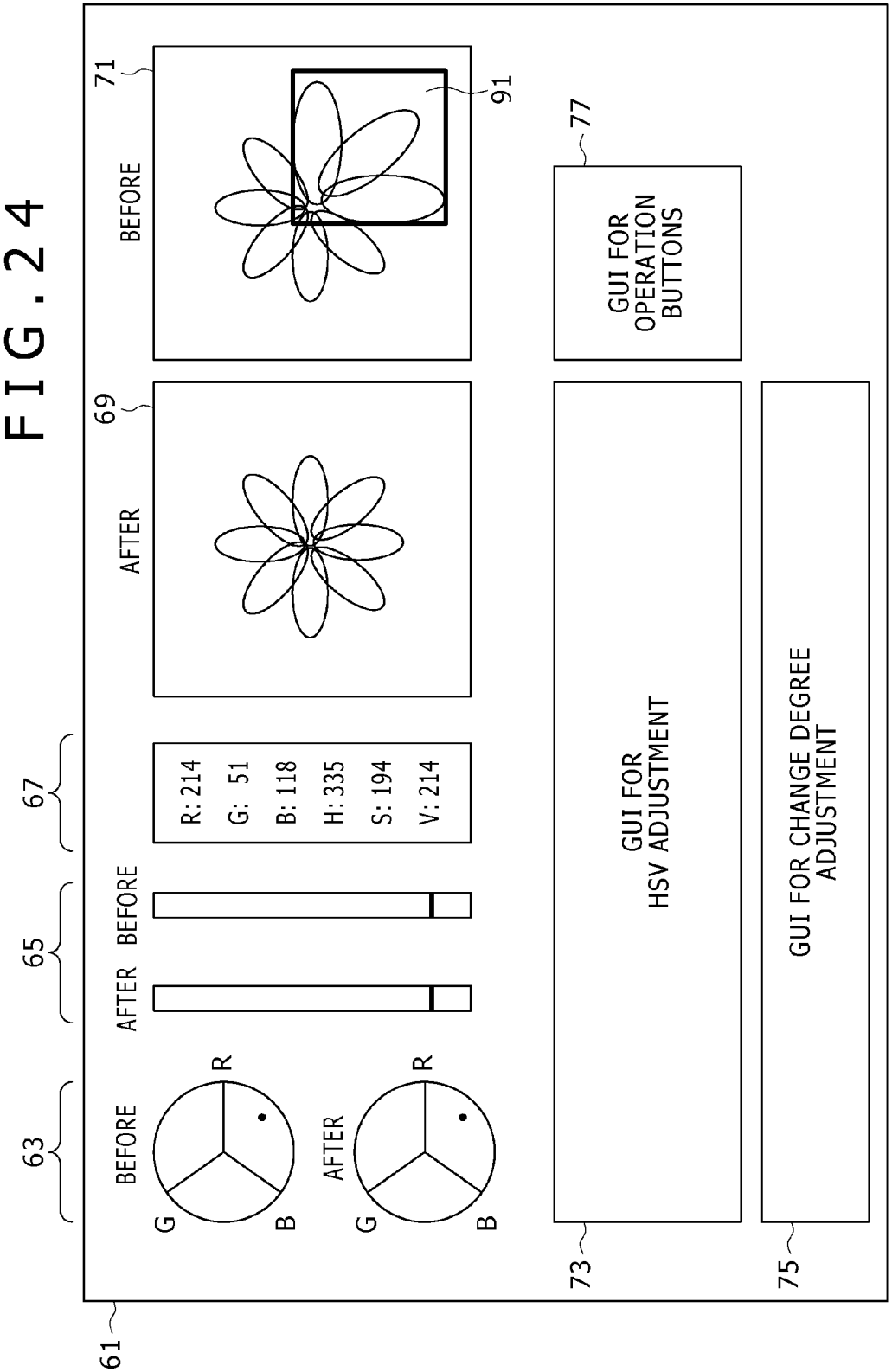
FIGS. 24 and 25 are schematic views illustrating different partial enlarged displaying functions within a designated region.
Figure 25:
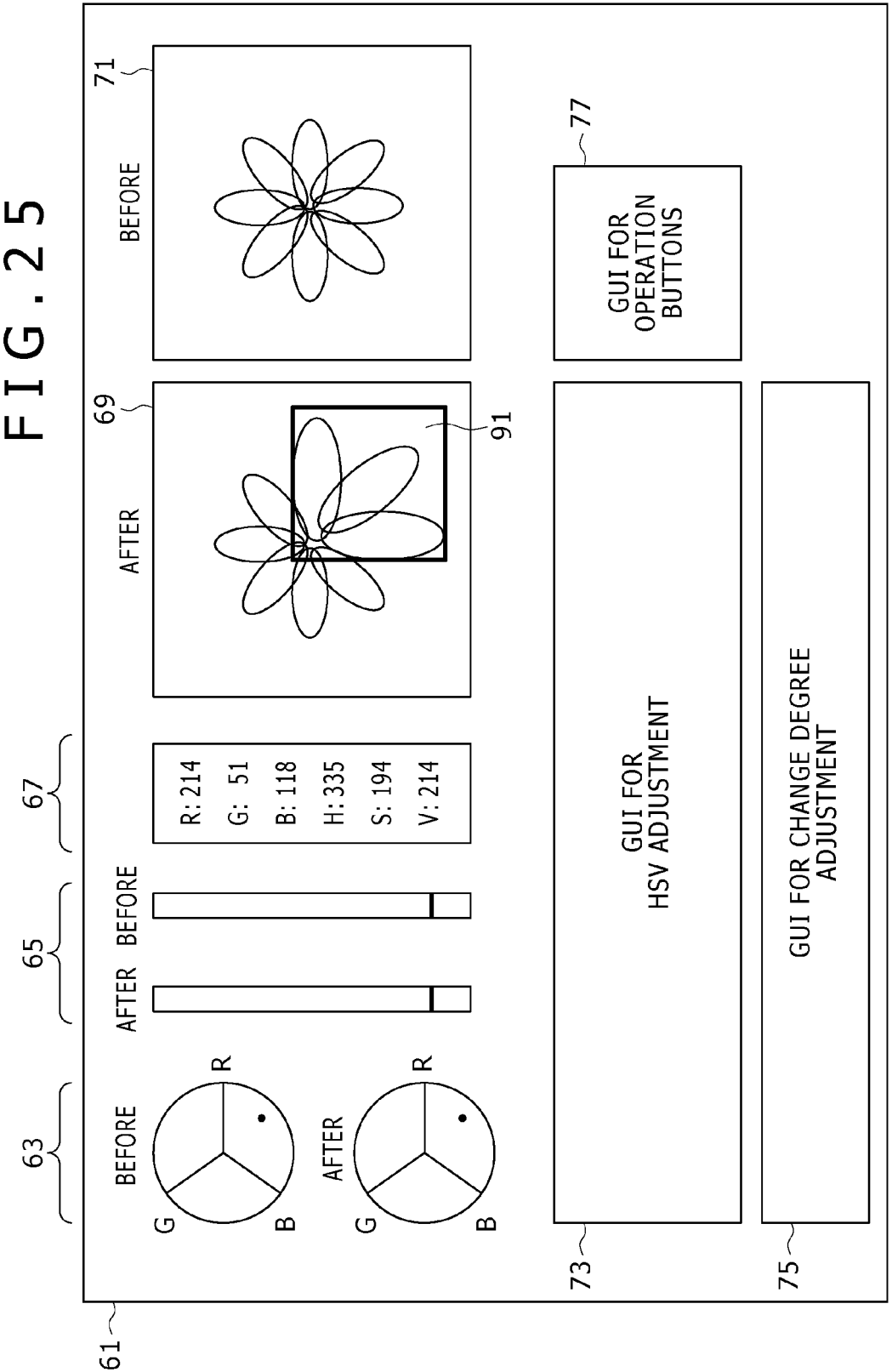

Although it is difficult to recognize because a chromatic color may not be represented in FIG. 24, the color of the region designated by the pointer 81 is proximate to magenta M. Therefore, the dark round mark 83 and the horizontal bar 85 are displayed in the proximity of a substantially middle portion between R and B.

Figure 22A:
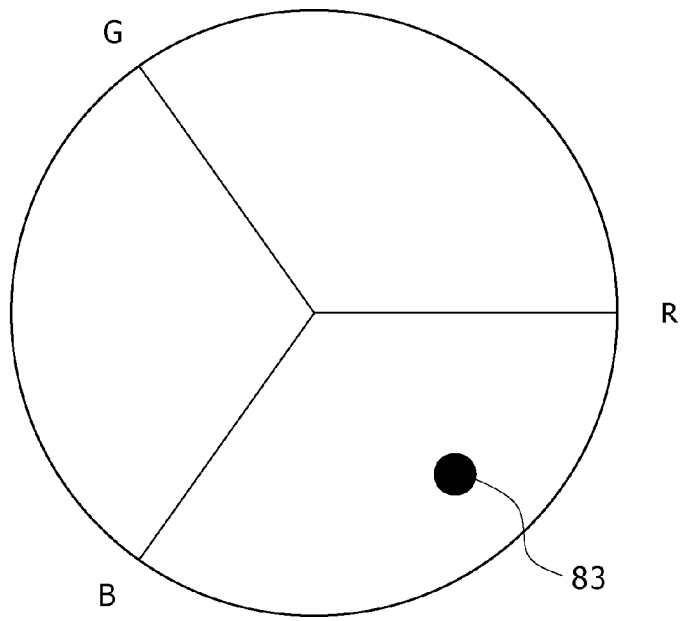
FIGS. 22A and 22B are schematic views illustrating display forms of a hue ring according to a difference in saturation of a designated region.
Figure 22B:
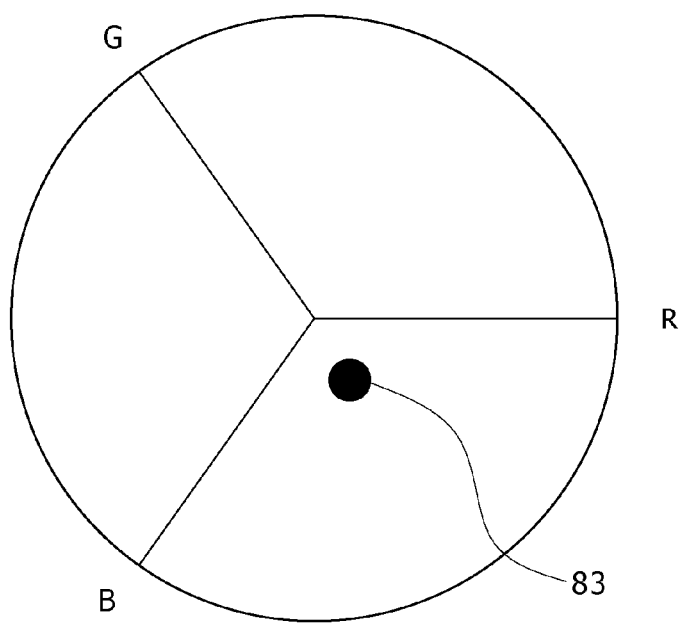

It is to be noted that each hue ring can indicate coordinate values on the two coordinate axes of the hue and the saturation. Accordingly, if the saturation is different, then also the same magenta is displayed as dark round marks 83 at different display positions. FIG. 22A illustrates an example of the display where the saturation is high while FIG. 22B illustrates an example of the display where the saturation is low.

Further, the dark round mark 83 and the horizontal bar 85 interlock also with a change of a color adjustment parameter inputted through the display place 73 or the display place 75. In other words, the display position of the dark round mark 83 or the horizontal bar 85 on the corresponding hue ring or hue bar chart changes in response to a color adjustment operation.

Through the display of the dark round mark 83 or the horizontal bar 85, the operator can confirm the absolute position on an accurate color coordinate system without relying upon the sense thereof.

For example, even if the user may not discriminate whether a thick red region is of the orange type (color having a much yellow component) or of the pink type (color having a much magenta component) when the user merely observes the display of the display place 69 or the display place 71, the user can definitely recognize the position on the color coordinate system.

Accordingly, also where the hue and the saturation are adjusted individually and independently of each other and also where the degree of change is adjusted independently, the user can confirm the amount of change quantitatively as a variation of the physical position of the dark round mark 83 or the horizontal bar 85.

Further, on the adjustment screen 61, coordinate values on the color coordinate system are displayed as coordinate values (numerical values) in the display place 67. In the present example, both of RGB coordinate values and HSV coordinate values can be confirmed as numerical values. Therefore, the operator can confirm color coordinate values in a region designated by the pointer 81 uniquely as numerical values. By confirming as numerical values, slight difference of color coordinate values can be recognized by the operator.

Further, the adjustment screen 61 is displayed such that the display lightness in a region designated by the pointer 81 and the display lightness of the hue rings and hue bar charts coincide with each other.

Figure 23A:
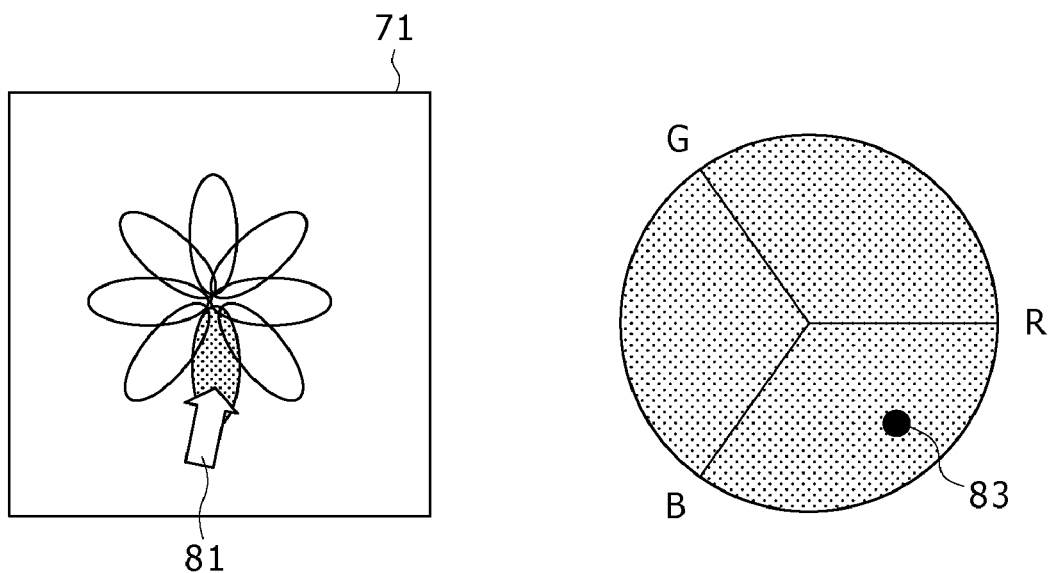
FIGS. 23A and 23B are schematic views illustrating display forms of a hue ring according to a difference in lightness of a designated region.
Figure 23B:
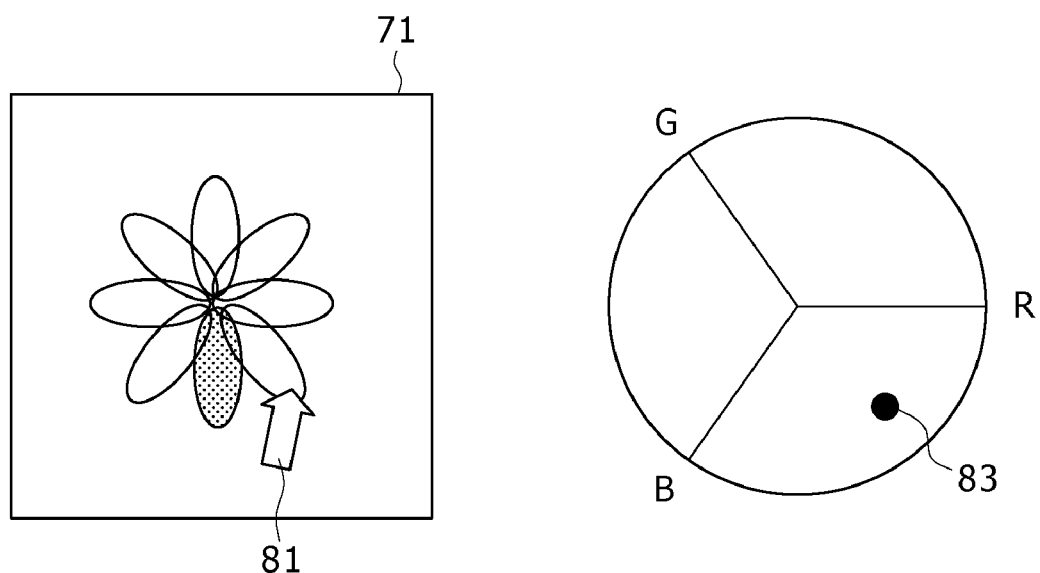

FIGS. 23A and 23B illustrate an image of the interlocking function. FIG. 23A shows an example of a display where the pointer 81 is positioned in a region having a rather low lightness (indicated by dots). Meanwhile, FIG. 23B shows an example of a display where the pointer 81 is positioned in a region having a rather high lightness.

Even if the regions have a same hue and saturation, if the lightness differs, then the visual impression which the operator has differs. Accordingly, if the display lightness of the hue ring and the hue bar chart is interlocked with the display lightness of a designated region, then the influence of the color adjustment executed through the display place 73 or the display place 75 can be predicted accurately.

In this manner, according to the adjustment screen 61 proposed by the inventor of the present invention, the four dimensions of the hue, saturation, lightness and degree of change can be represented by a hue ring. Further, also the hue bar chart can represent the three dimensions of the hue, lightness and degree of change. It is to be noted that, if a function of interlinking the display saturation of the hue bar chart with the saturation of a region designated by the pointer 81 is incorporated, then also the hue bar chart can represent the four dimensions of the hue, saturation, lightness and degree of change.

Further, the adjustment screen 61 incorporates a function of displaying an image within a fixed range around a region designated by the pointer 81 in a partially enlarged scale. An example of such display is shown in FIG. 24. In particular, FIG. 24 shows a display example which helps the user to specify a color to be adjusted on an image (original image) before adjustment. Referring to FIG. 24, an expanded image of a region around a region indicated by the pointer 81 is displayed in a region surrounded by a framework 91. This expansion function is effective when the color adjustment is performed for particulars of an image.

It is to be noted that the partial expansion function of an image is effective also where a result of adjustment is confirmed on an image after the adjustment.

Figure 26:
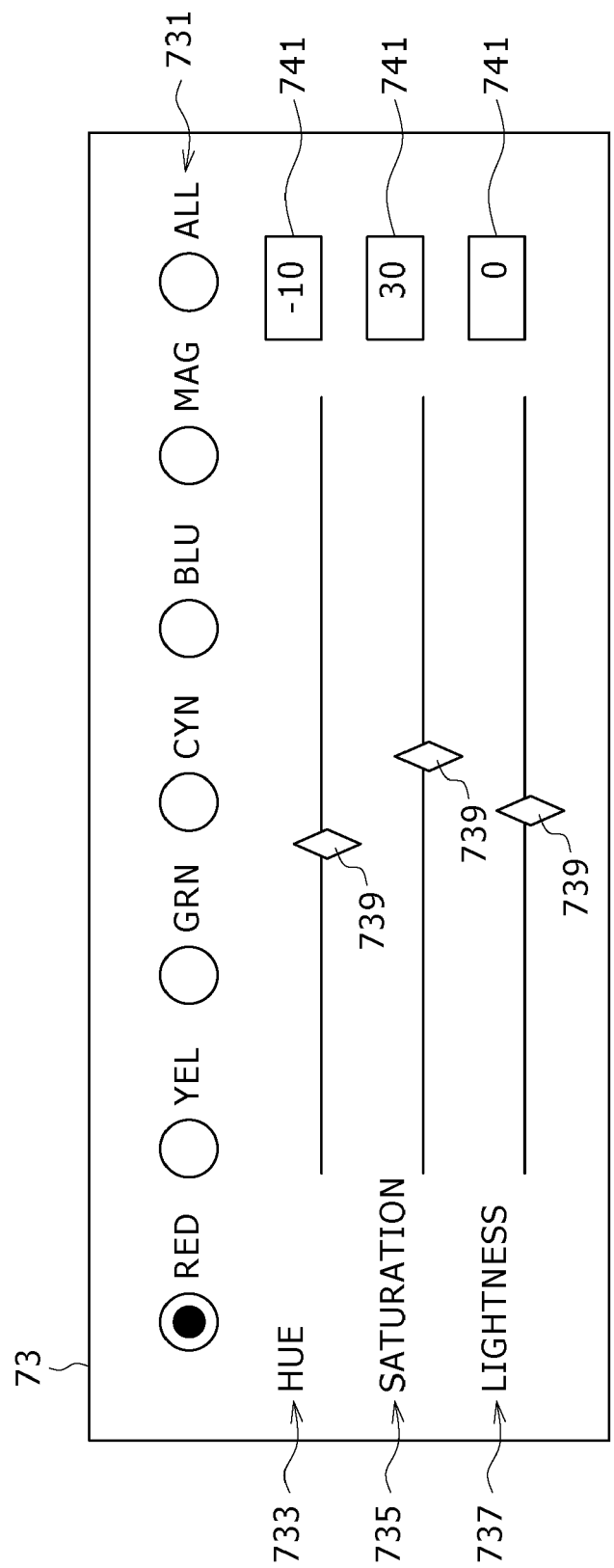
FIG. 26 is a schematic view showing an example of details of a GUI for HSV adjustment.
Figure 27:
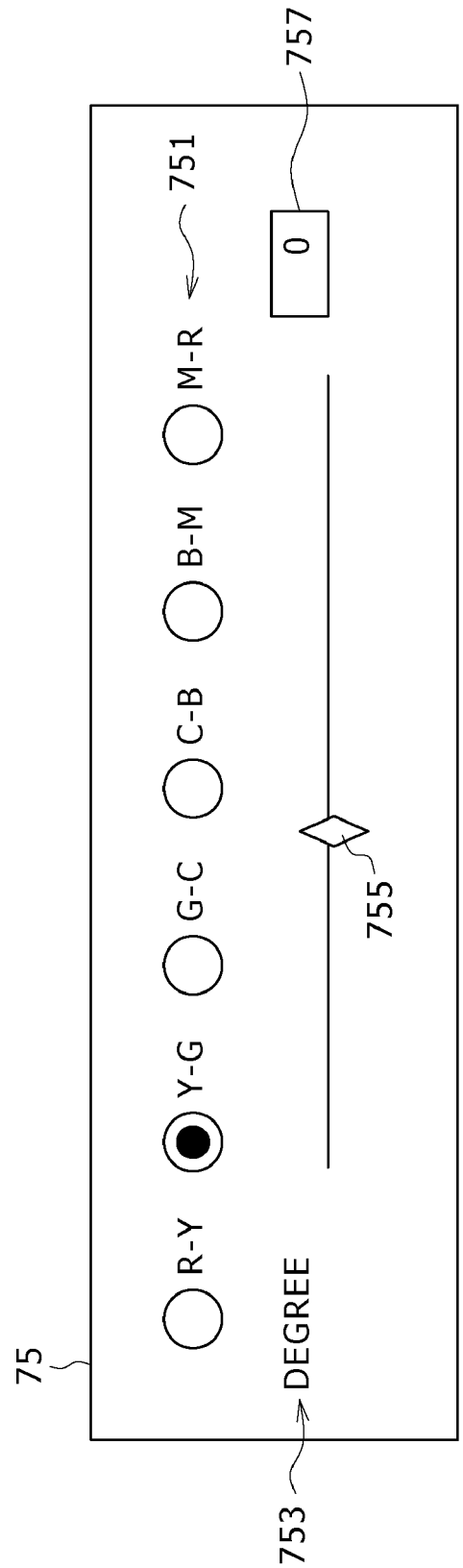
FIG. 27 is a schematic view showing an example of details of a GUI for change degree adjustment.

The detailed substance of display places 73 and 75 for adjusting the hue, saturation, lightness and degree of change independently of each other is shown in FIGS. 26 and 27. FIG. 26 illustrates the detailed substance of the GUI 73 for HSV adjustment while FIG. 27 illustrates the detailed substance of the GUI 75 for change degree adjustment.

The GUI 73 for HSV adjustment includes a phase selection place 731, a adjustment bar 733 for hue adjustment, an adjustment bar 735 for saturation adjustment, an adjustment bar 737 for lightness adjustment, adjustment slider buttons 739, and adjustment amount display places 741.

The phase selection place 731 is used commonly for adjustment of the hue, saturation and lightness. In the case shown in FIG. 26, any of R, G, B, C, M, Y and all phases "ALL" can be selected on the phase selection place 731.

Referring to FIG. 26, the user can individually select one of the phases using a pointer or the like and then operate the adjustment slider button 739 of a desired one of the adjustment bars to designate necessary color adjustment.

It is to be noted that the amount of adjustment can be confirmed as a numerical value in the adjustment amount display place 741. Simultaneously, the user can confirm the substance of adjustment as a variation of the display form of the display places 63, 65 and 69. As described hereinabove, also the dark round marks 83 and the horizontal bars 85 displayed on the hue rings and the hue bar charts, respectively, move in an interlocking relationship with the color adjustment.

An adjustment amount (parameter) inputted through the GUI 73 for HSV adjustment is used for an arithmetic operation process of the color adjustment arithmetic operation section and a selection process of a reference table.

On the other hand, referring to FIG. 27, the GUI 75 for change degree adjustment includes a phase selection place 751, a change degree adjustment bar 753, an adjustment slider button 755 and an adjustment amount display place 757.

Also GUI 75 for change degree adjustment has a basic configuration similar to that of the GUI 73 for HSV adjustment. The user would select one of the phases on the phase selection place 751 and then operate the adjustment slider button 755.

It is to be noted that, since the adjustment of the degree of color change is executed with regard to a particular phase range, the phase selection place 751 does not include a choice for all phases.

The adjustment substances inputted through the GUIs for adjustment are stored into a working area not shown. In the present example, the ten latest parameter sets are stored.

Figure 28:
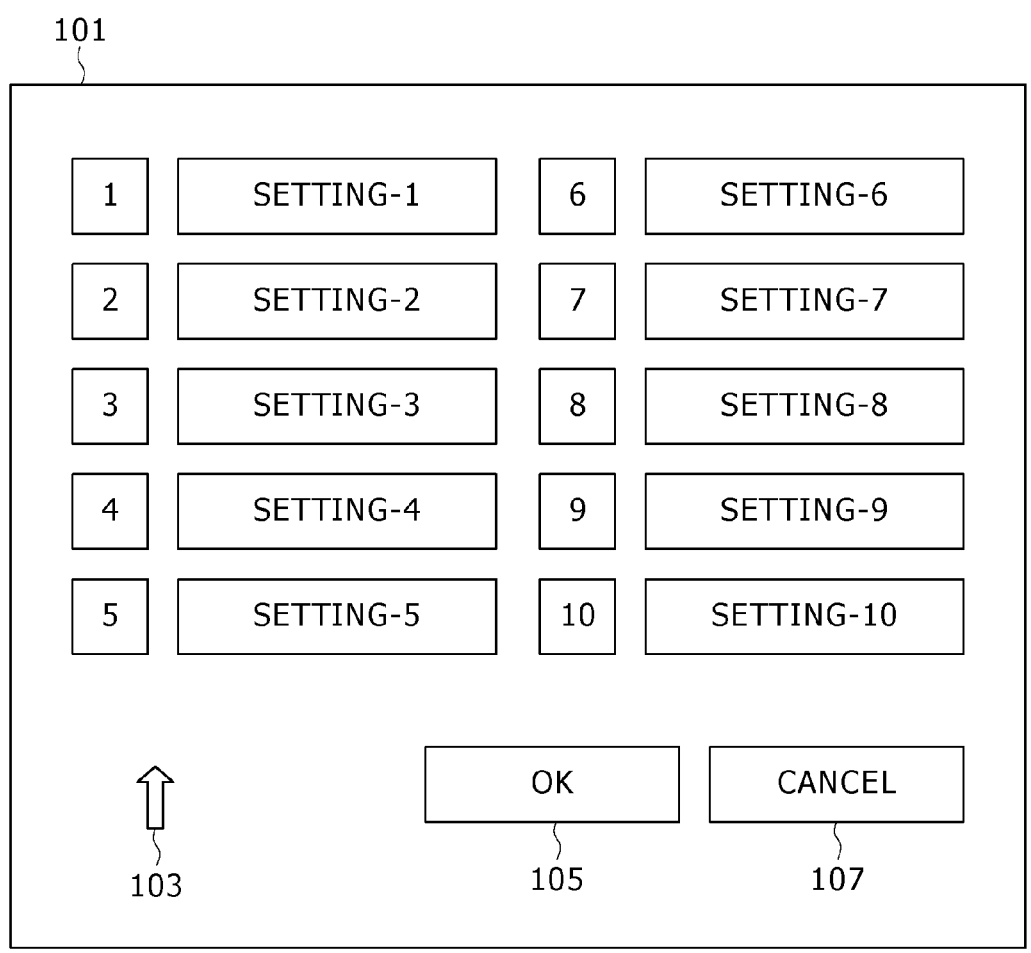
FIG. 28 is a schematic view showing an example of a screen which displays the ten different latest adjustment substances.

FIG. 28 shows a GUI 101 prepared such that such ten parameter sets can be confirmed.

It is to be noted that the parameter sets displayed on the GUI 101 can be read out or deleted individually in response to a designation of a pointer 103.

Reading out of the substance of adjustment is executed by designating one of the parameter sets by means of the pointer 103 and then operating an "OK" button 105.

Deletion of the substance of adjustment is executed by designating one of the parameter sets by means of the pointer 103 and then operating a "CANCEL" button 107.

Finally, an example of a display of various operation buttons (icons) relating to an editing operation is described. A GUI for this corresponds to the display place 77.

Figure 29:
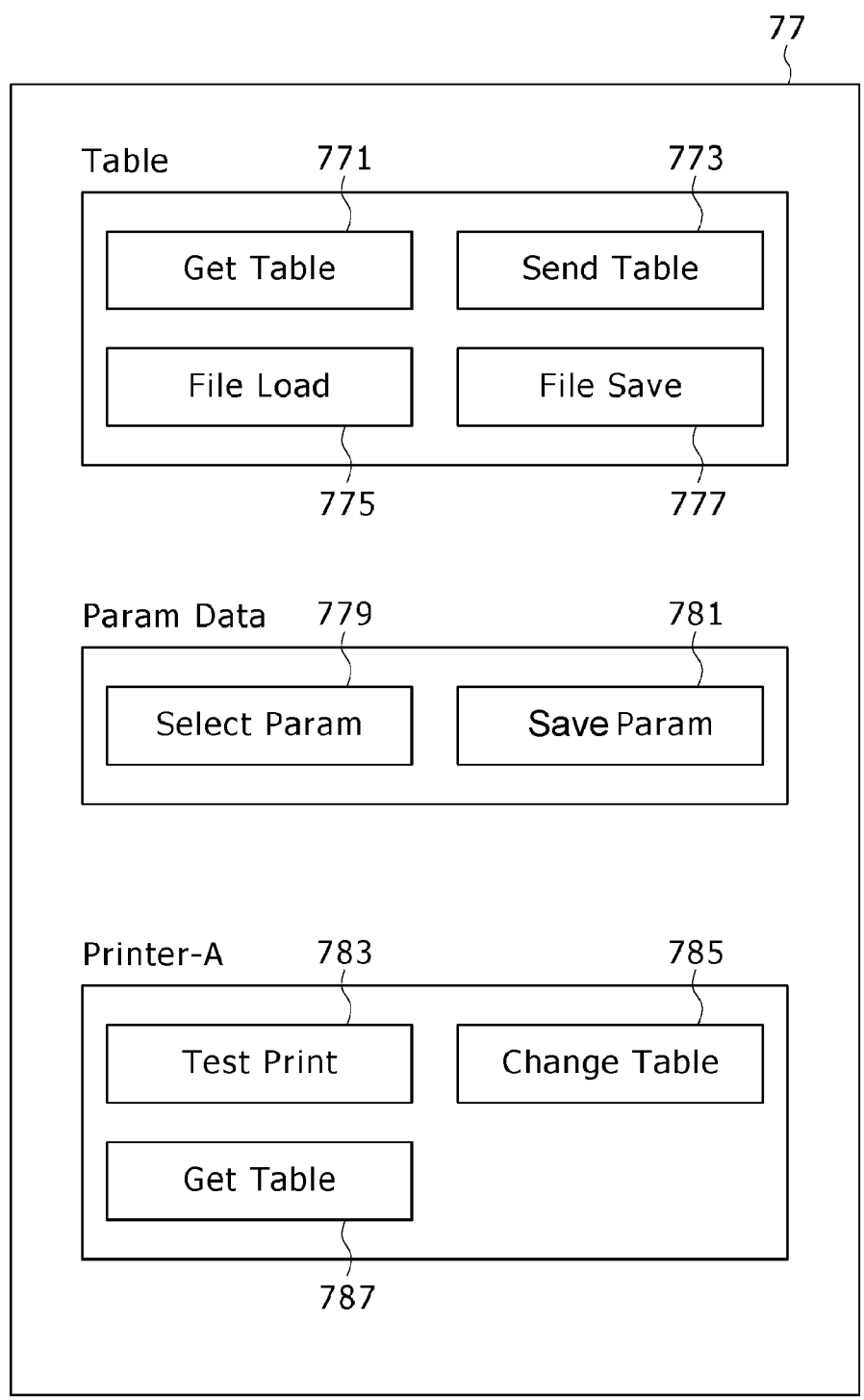
FIG. 29 is a schematic view showing an example of a GUI for operation buttons.

FIG. 29 illustrates the detailed substance of the display place 77. In the example illustrated, the display place 77 includes a "Get Table" button 771, a "Send Table" button 773, a "File Load" button 775, a "File Save" button 777, a "Select Parameter" button 779, a "Save Parameter" button 781, a "Test Print" button 783, a "Change Table" button 785 and a "Get Table" button 787.

The "Get Table" button 771 is used to read out a parameter table set in the printing apparatus 3.

The "Send Table" button 773 is used to transmit a parameter table to the printing apparatus 3.

The "File Load" button 775 is used to read file data of a parameter set into the computer 1.

The "File Save" button 777 is used to store file data of a parameter set into the computer 1.

The "Select Parameter" button 779 is used to select a parameter set (FIG. 28) stored in the working area.

The "Save Parameter" button 781 is used to store a parameter set (FIG. 28) into the working area.

The "Test Print" button 783 is used to transmit image data during or after color adjustment to the printing apparatus 3 so that test printing is executed.

The "Change Table" button 785 is used to change over that one of the parameter sets stored in the working area which is to be used for color adjustment.

The "Get Table" button 787 is used to take out image data from the printing apparatus 3.

F. Effects by Application of the Color Adjustment Technique

By performing the color adjustment in HSV space in such a manner as described above, a color adjustment apparatus wherein the gray balance is not deteriorated can be provided.

Further, even where an input image is given as RGB data, since the adjustment amount can be designated in HSV space which can be recognized readily by the sense of a human being, the color adjustment can be executed more simply than ever.

Further, since, different from the technique in related art, the hue, saturation and lightness only for a particular color (phase range) can be adjusted independently, color adjustment can be applied only to a portion which requires such adjustment.

Further, since the degree of change of a color from a certain phase axis to another adjacent phase axis can be adjusted, the degree of freedom in color adjustment can be improved significantly when compared with that of the technique in related art.

Further, since color coordinates of a designated region are displayed explicitly on a hue ring or a hue bar chart in an interlocking relationship with a region designation operation in an editing image region, the operator can be provided with a material for object decision. By this function, the color adjustment operation can be changed from an operation which relies upon the sense of an individual operator to a different operation which involves the objectivity.

Furthermore, since color coordinates of a region designated in an editing image region can be confirmed as numerical values, precise color adjustment can be anticipated.

Further, since the display lightness of the hue rings and the hue bar charts can be adjusted in an interlocking relationship with the display lightness in a region designated in an editing image region, a change on the hue rings and the hue bar charts can be made coincide with an actual change in color. Where this function is incorporated, a color adjustment operation can be changed from an operation which relies upon the sense of an individual operator to an objective operation.

Further, since a change of any of the dark round marks 83, horizontal bars 85, hue and so forth on the hue rings and the hue bar charts is interlocked also with an adjustment operation of a color adjustment parameter, the substance of an editing operation can be confirmed readily upon region designation and also during editing.

G. Other Examples a. In the example described hereinabove, a printing system for medical use is described. However, the present invention can be similarly applied also to a printing system which is used in an office or a home.

b. In the example described hereinabove, a color adjustment function of an image to be printed by a printing apparatus is executed by the computer side. However, the present invention can be applied also to an alternative case wherein color adjustment of a display apparatus is executed by an externally connected computer.

c. In the example described hereinabove, the phase is adjusted independently for a particular phase or phase range. However, all phases may be rotated equally.

Similarly, in the example described hereinabove, the saturation is adjusted independently for a particular phase or phase range. However, the saturation may otherwise be adjusted equally for all phases.

Similarly, in the example described hereinabove, the lightness is adjusted independently for a particular phase or phase range. However, the lightness may otherwise be adjusted equally for all phases.

d. In the example described hereinabove, a color adjustment process is incorporated on the computer side. However, the display function of the adjustment screen 61 described hereinabove may be incorporated in a printing apparatus or a display apparatus such that a color adjustment operation can be executed in a self-completed fashion. In this instance, preferably the printing apparatus incorporates a display device or incorporates a function which can output a print image in the image memory or a GUI for color adjustment to an external monitor. Further, the internal configuration example of the computer 1 can be used as the display apparatus.

e. In the example described hereinabove, color coordinates corresponding to a region designated by a pointer are explicitly displayed in the form of a dark round mark or a horizontal bar. However, an arbitrary display form can be used for coordinate values if the coordinate values can be specified. For example, color coordinates may be explicitly displayed using an arrow mark.

f. In the example described hereinabove, the image processing apparatus which executes the color adjustment function is a computer. However, for example, a video camera, a digital camera, a game apparatus, a scanner, a portable information terminal (such as, for example, a portable computer, a portable telephone set, a portable game machine, an electronic dictionary or the like), a clock, a watch, an image reproduction apparatus (such as, for example, an optical disk apparatus or a home server), a monitor, a television receiver, a processing board or a processing card in which the function according to the present invention is incorporated, or the like may be used as the image processing apparatus.

g. In the example described hereinabove, software or hardware which executes the color adjustment function is incorporated in a completed fashion in each apparatus.

However, the pertaining software program or hardware may otherwise be incorporated discretely in a plurality of apparatus.

Thereupon, the software program may be distributed through a network or may be stored in and distributed together with a storage medium. The storage medium for distribution includes a magnetic recording medium, an optical storage medium, a semiconductor storage medium and so forth.

h. The example described hereinabove may be modified in various forms within the spirit and scope of the present invention. Also various modifications and applications may be made by creation or combination based on the disclosure of the present invention.

What is claimed is:

1. A color adjustment apparatus, comprising:
a display device configured to display a graphical user interface that includes an editing image region;
a parameter setting section;
a degree of color change adjustment section;
a phase range decision section; and
a digital signal processing section coupled to the display device, and the parameter setting section,
wherein,
the parameter setting section includes
a color information storage section configured to store color information regarding an arbitrary region designated via a pointer in the editing image region,
a color coordinate explicitly displaying section configured to implement a process to display a mark on a hue ring and display a bar on a hue bar chart, which specifies color coordinates corresponding to the color information, a position of the mark and a position of the bar indicating the color information of the arbitrary region designated by the pointer, and
a lightness interlocking section configured to acquire lightness information of a region designated via the pointer based on the color information and to interlock the display lightness of the hue ring or the hue bar such that a lightness of the arbitrary region designated by the pointer within the editing image region coincides with a lightness of the hue ring and hue bar chart,
the phase range decision section is configured to determine if a color component of selected image data is within a phase range designated by a user,
the graphical user interface includes a section enabling an adjustment of a degree of change between adjacent colors, the degree of change being a change in a relationship of a color component with respect to an angular phase of the color component, and
the degree of color change adjustment section implements a color change relationship between the color component and the angular phase as determined by input from the graphical user interface if a result of the phase range decision section indicates that the selected image data is within the phase range.

2. The color adjustment apparatus according to claim 1, wherein the editing image region includes two display regions including an image region for an image before editing and another image region for an image after editing.

3. The color adjustment apparatus according to claim 1, wherein the hue ring or the hue bar chart has a display region for an image before editing and another display region for an image after editing.

4. A color adjustment apparatus, comprising:
a display device configured to display a graphical user interface that includes an editing image region;
a parameter setting section;
a degree of color change adjustment section;
a phase range decision section; and
a digital signal processing section coupled to the display device and the parameter setting section,
wherein, the parameter setting section includes
a color information storage section configured to store color information regarding an arbitrary region designated via a pointer in the editing image region;
a color coordinate explicitly displaying section configured to explicitly display the color information with respect to the arbitrary region designated by the pointer as coordinate values in the form of numerical values on a color coordinate system given by a phase, a saturation and a lightness, the coordinate values including coordinate values for red (R), green (G), and blue (B), and
a lightness interlocking section configured to acquire lightness information of a region designated via the pointer based on the color information and interlock the display lightness of the hue ring or the hue bar such that a lightness of the arbitrary region designated by the pointer within the editing image region coincides with a lightness of the hue ring and hue bar chart,
the phase range decision section is configured to determine if a color component of selected image data is within a phase range designated by a user,
the graphical user interface includes a section enabling an adjustment of a degree of change between adjacent colors, the degree of change being a change in a relationship of a color component with respect to an angular phase of the color component, and
the degree of color change adjustment section implements a color change relationship between the color component and the angular phase as determined by input from the graphical user interface if a result of the phase range decision section indicates that the selected image data is within the phase range.

5. A color adjustment apparatus, comprising:
a display device to display a graphical user interface that includes an editing image region;
a parameter setting section;
a degree of color change adjustment section;
a phase range decision section; and
a digital signal processing section coupled to the display device, the parameter setting section,
wherein,
the parameter setting section includes:
(a) a color information storage section configured to store color information regarding an arbitrary region designated via a pointer in the editing image region, and
(b) a lightness interlocking section configured to acquire lightness information of a region designated via the pointer based on the color information and interlock the display lightness of a hue ring or a hue bar chart to be used for color adjustment of the region with the display lightness given by the lightness information such that a lightness of the arbitrary region designated by the pointer within the editing image region coincides with a lightness of the hue ring and hue bar chart,

19 the phase range decision section is configured to determine if a color component of selected image data is within a phase range designated by a user, the graphical user interface includes a section enabling an adjustment of a degree of change between adjacent colors, the degree of change being a change in a relationship of a color component with respect to an angular phase of the color component, and the degree of color change adjustment section implements a color change relationship between the color component and the angular phase as determined by input from the graphical user interface if a result of the phase range decision section indicates that the selected image data is within the phase range.

6. A display apparatus having a display device configured to display an image according to input image data, and comprising a degree of color change adjustment section, a phase range decision section, and a parameter setting section that includes:

a color information storage section configured to store color information regarding an arbitrary region designated via a pointer in an editing image region of a graphical user interface;

a color coordinate explicitly displaying section configured to implement a process to display a mark on a hue ring and display a bar on a hue bar chart, which specifies color coordinates corresponding to the color information, a position of the mark and a position of the bar indicating the color information of the arbitrary region designated by the pointer, a lightness interlocking section configured to acquire lightness information of a region designated via the pointer based on the color information and interlock the display lightness of the hue ring or the hue bar such that a lightness of the arbitrary region designated by the pointer within the editing image region coincides with a lightness of the hue ring and hue bar chart, wherein, the phase range decision section is configured to determine if a color component of selected image data is within a phase range designated by a user, the graphical user interface includes a section enabling an adjustment of a degree of change between adjacent colors, the degree of change being a change in a relationship of a color component with respect to an angular phase of the color component, and the degree of color change adjustment section implements a color change relationship between the color component and the angular phase as determined by input from the graphical user interface if a result of the phase range decision section indicates that the selected image data is within the phase range.

7. A display apparatus having a display device configured to display an image according to input image data, and comprising a degree of color change adjustment section, a phase range decision section, and a parameter setting section that includes:

a color information storage section configured to store color information regarding an arbitrary region designated via a pointer in an editing image region of a graphical user interface; and a color coordinate explicitly displaying section configured to explicitly display the color information with respect to the arbitrary region designated by the pointer as coordinate values in the form of numerical values on a color coordinate system given by a phase, a saturation and a lightness, the coordinate values including coordinate values for red (R), green (G), and blue (B), and

20 a lightness interlocking section configured to acquire lightness information of a region designated via the pointer based on the color information and interlock the display lightness of the hue ring or the hue bar such that a lightness of the arbitrary region designated by the pointer within the editing image region coincides with a lightness of the hue ring and hue bar chart, wherein, the phase range decision section is configured to determine if a color component of selected image data is within a phase range designated by a user, the graphical user interface includes a section enabling an adjustment of a degree of change between adjacent colors, the degree of change being a change in a relationship of a color component with respect to an angular phase of the color component, and the degree of color change adjustment section implements a color change relationship between the color component and the angular phase as determined by input from the graphical user interface if a result of the phase range decision section indicates that the selected image data is within the phase range.

8. A display apparatus having a display device configured to display an image according to input image data, and comprising a degree of color change adjustment section, a phase range decision section, and a parameter setting section that includes:

a color information storage section configured to store color information regarding an arbitrary region designated via a pointer in an editing image region of a graphical user interface; and a lightness interlocking section configured to acquire lightness information of a region designated via the pointer based on the color information and interlock the display lightness of a hue ring or a hue bar chart to be used for color adjustment of the region with the display lightness given by the lightness information such that a lightness of the arbitrary region designated by the pointer within the editing image region coincides with a lightness of the hue ring and hue bar chart, wherein, the phase range decision section is configured to determine if a color component of selected image data is within a phase range designated by a user, the graphical user interface includes a section enabling an adjustment of a degree of change between adjacent colors, the degree of change being a change in a relationship of a color component with respect to an angular phase of the color component, and the degree of color change adjustment section implements a color change relationship between the color component and the angular phase as determined by input from the graphical user interface if a result of the phase range decision section indicates that the selected image data is within the phase range.

9. A printing apparatus, comprising a degree of color change adjustment section, a phase range decision section, and a parameter setting section that includes:

a color information storage section configured to store color information regarding an arbitrary region designated via a pointer in an editing image region of a graphical user interface;

a color coordinate explicitly displaying section configured to implement a process to display a mark on a hue ring and display a bar on a hue bar chart, which specifies color coordinates corresponding to the color information, a position of the mark and a position of the bar indicating the color information of the arbitrary region designated by the pointer, and a lightness interlocking section configured to acquire lightness information of a region designated via the pointer based on the color information and interlock the display lightness of the hue ring or the hue bar such that a lightness of the arbitrary region designated by the pointer within the editing image region coincides with a lightness of the hue ring and hue bar chart, wherein, the phase range decision section is configured to determine if a color component of selected image data is within a phase range designated by a user, the graphical user interface includes a section enabling an adjustment of a degree of change between adjacent colors, the degree of change being a change in a relationship of a color component with respect to an angular phase of the color component, and the degree of color change adjustment section implements a color change relationship between the color component and the angular phase as determined by input from the graphical user interface if a result of the phase range decision section indicates that the selected image data is within the phase range.

10. A printing apparatus comprising a degree of color change adjustment section, a phase range decision section, and a parameter setting section that includes:

a color information storage section configured to store color information regarding an arbitrary region designated via a pointer in an editing image region of a graphical user interface;

a color coordinate explicitly displaying section configured to explicitly display the color information with respect to the arbitrary region designated by the pointer as coordinate values in the form of numerical values on a color coordinate system given by a phase, a saturation and a lightness, the coordinate values including coordinate values for red (R), green (G), and blue (B), and a lightness interlocking section configured to acquire lightness information of a region designated via the pointer based on the color information and interlock the display lightness of the hue ring or the hue bar such that a lightness of the arbitrary region designated by the pointer within the editing image region coincides with a lightness of the hue ring and hue bar chart, wherein, the phase range decision section is configured to determine if a color component of selected image data is within a phase range designated by a user, the graphical user interface includes a section enabling an adjustment of a degree of change between adjacent colors, the degree of change being a change in a relationship of a color component with respect to an angular phase of the color component, and the degree of color change adjustment section implements a color change relationship between the color component and the angular phase as determined by input from the graphical user interface if a result of the phase range decision section indicates that the selected image data is within the phase range.

11. A printing apparatus comprising a degree of color change adjustment section, a phase range decision section, and a parameter setting section that includes:

a color information storage section configured to store color information regarding an arbitrary region designated via a pointer in an editing image region; and a lightness interlocking section configured to acquire lightness information of a region designated via the pointer based on the color information and interlock the display lightness of a hue ring or a hue bar chart to be used for color adjustment of the region with the display lightness given by the lightness information such that a lightness of the arbitrary region designated by the pointer within the editing image region coincides with a lightness of the hue ring and hue bar chart, wherein, the phase range decision section is configured to determine if a color component of selected image data is within a phase range designated by a user, the graphical user interface includes a section enabling an adjustment of a degree of change between adjacent colors, the degree of change being a change in a relationship of a color component with respect to an angular phase of the color component, and the degree of color change adjustment section implements a color change relationship between the color component and the angular phase as determined by input from the graphical user interface if a result of the phase range decision section indicates that the selected image data is within the phase range.

12. An information processing apparatus configured to adjust the color of an image according to input image data via a graphical user interface that includes an editing image region, comprising:

a display device configured to display the graphical user interface including the editing image region;

a parameter setting section;

a degree of color change adjustment section, a phase range decision section, and a digital signal processing section coupled to the display device and the parameter setting section, wherein, the parameter setting section includes a color information storage section configured to store color information regarding an arbitrary region designated via a pointer in an editing image region, a color coordinate explicitly displaying section configured to implement a process to display a mark on a hue ring and display a bar on a hue bar chart, which specifies color coordinates corresponding to the color information, a position of the mark and a position of the bar indicating the color information of the arbitrary region designated by the pointer, and a lightness interlocking section configured to acquire lightness information of a region designated via the pointer based on the color information and interlock the display lightness of the hue ring or the hue bar such that a lightness of the arbitrary region designated by the pointer within the editing image region coincides with a lightness of the hue ring and hue bar chart, wherein, the phase range decision section is configured to determine if a color component of selected image data is within a phase range designated by a user, the graphical user interface includes a section enabling an adjustment of a degree of change between adjacent colors, the degree of change being a change in a relationship of a color component with respect to an angular phase of the color component, and the degree of color change adjustment section implements a color change relationship between the color component and the angular phase as determined by input from the graphical user interface if a result of the phase range decision section indicates that the selected image data is within the phase range.

13. An information processing apparatus configured to adjust the color of an image according to input image data via a graphical user interface that includes an editing image region, comprising:
a display device configured to display the graphical user interface including the editing image region;
a parameter setting section;
a degree of color change adjustment section,
a phase range decision section, and
a digital signal processing section coupled to the display device and the parameter setting section,
wherein,
the parameter setting section including
a color information storage section configured to store color information regarding an arbitrary region designated via a pointer in the editing image region, and
a color coordinate explicitly displaying section configured to explicitly display the color information with respect to the arbitrary region designated by the pointer as coordinate values in the form of numerical values on a color coordinate system given by a phase, a saturation and a lightness, the coordinate values including coordinate values for red (R), green (G), and blue (B), and
a lightness interlocking section configured to acquire lightness information of a region designated via the pointer based on the color information and interlock the display lightness of the hue ring or the hue bar such that a lightness of the arbitrary region designated by the pointer within the editing image region coincides with a lightness of the hue ring and hue bar chart,
the phase range decision section is configured to determine if a color component of selected image data is within a phase range designated by a user,
the graphical user interface includes a section enabling an adjustment of a degree of change between adjacent colors, the degree of change being a change in a relationship of a color component with respect to an angular phase of the color component, and
the degree of color change adjustment section implements a color change relationship between the color component and the angular phase as determined by input from the graphical user interface if a result of the phase range decision section indicates that the selected image data is within the phase range.

14. An information processing apparatus configured to adjust the color of an image according to input image data via a graphical user interface that includes an editing image region, comprising:
a display device configured to display the graphical user interface including the editing image region;
a parameter setting section;
a degree of color change adjustment section;
a phase range decision section; and
a digital signal processing section coupled to the display device and the parameter setting section,
wherein,
the parameter setting section includes
a color information storage section configured to store color information regarding an arbitrary region designated via a pointer in the editing image region; and
a lightness interlocking section configured to acquire lightness information of a region designated via the pointer based on the color information and interlock the display lightness of a hue ring or a hue bar chart to be used for color adjustment of the region with the display lightness given by the lightness information such that a lightness of the arbitrary region designated by the pointer within the editing image region coincides with a lightness of the hue ring and hue bar chart,
the phase range decision section is configured to determine if a color component of selected image data is within a phase range designated by a user,
the graphical user interface includes a section enabling an adjustment of a degree of change between adjacent colors, the degree of change being a change in a relationship of a color component with respect to an angular phase of the color component, and
the degree of color change adjustment section implements a color change relationship between the color component and the angular phase as determined by input from the graphical user interface if a result of the phase range decision section indicates that the selected image data is within the phase range.

15. A color adjustment apparatus which performs a method of color adjustment, comprising the steps of:
storing color information in a color information storage section of a computer memory, the color information corresponds to an arbitrary region designated via a pointer in an editing image region;
explicitly displaying a mark, which specifies color coordinates corresponding to the color information, on a hue ring prepared for color adjustment,
explicitly displaying a bar on a hue bar chart; and
interlocking a display lightness of the hue ring or the hue bar such that a lightness of the arbitrary region designated by the pointer within the editing image region coincides with a lightness of the hue ring and hue bar chart,
wherein,
the editing image region, the hue ring, and the hue bar chart are provided on a graphical user interface,
a phase range decision section is configured to determine if a color component of selected image data is within a phase range designated by a user,
the graphical user interface includes a section enabling an adjustment of a degree of change between adjacent colors, the degree of change being a change in a relationship of a color component with respect to an angular phase of the color component,
a color change relationship between the color component and the angular phase is implemented as determined by input from the graphical user interface if a result of the phase range decision section indicates that the selected image data is within the phase range, and
a position of the mark and a position of the bar indicate the color information of the arbitrary region designated by the pointer.

16. A color adjustment apparatus which performs a method, of color adjustment comprising the steps of:

storing color information in a color information storage section of a computer memory, the color information corresponds to an arbitrary region designated via a pointer in an editing image region;

explicitly displaying the color information with respect to the arbitrary region designated by the pointer as coordinate values in the form of numerical values on a color coordinate system given by a phase, a saturation and a lightness, the coordinate values including coordinate values for red (R), green (G), and blue (B); and interlocking a display lightness of the hue ring or the hue bar such that a lightness of the arbitrary region designated by the pointer within the editing image region coincides with a lightness of the hue ring and hue bar chart, wherein, the editing image region and the coordinate values are provided on a graphical user interface, a phase range decision section is configured to determine if a color component of selected image data is within a phase range designated by a user, the graphical user interface includes a section enabling an adjustment of a degree of change between adjacent colors, the degree of change being a change in a relationship of a color component with respect to an angular phase of the color component, and a color change relationship between the color component and the angular phase is implemented as determined by input from the graphical user interface if a result of the phase range decision section indicates that the selected image data is within the phase range.

17. A color adjustment apparatus which performs a method, of color adjustment comprising the steps of:

storing color information regarding an arbitrary region designated via a pointer in an editing image region of a graphical user interface; and acquiring lightness information of a region designated via the pointer based on the color information and interlocking a display lightness of a hue ring or a hue bar chart to be used for color adjustment of the region with the display lightness given by the lightness information such that a lightness of the arbitrary region designated by the pointer within the editing image region coincides with a lightness of the hue ring and hue bar chart wherein, a phase range decision section is configured to determine if a color component of selected image data is within a phase range designated by a user, the graphical user interface includes a section enabling an adjustment of a degree of change between adjacent colors, the degree of change being a change in a relationship of a color component with respect to an angular phase of the color component, and a color change relationship between the color component and the angular phase is implemented as determined by input from the graphical user interface if a result of the phase range decision section indicates that the selected image data is within the phase range.

18. A displaying method for a graphical user interface on a display device, comprising the steps of:

storing color information in a color information storage section of a computer memory, the color information corresponds to an arbitrary region designated via a pointer in an editing image region;

explicitly displaying a mark, which specifies color coordinates corresponding to the color information, on a hue ring prepared for color adjustment, explicitly displaying a bar on a hue bar chart; and interlocking a display lightness of the hue ring or the hue bar such that a lightness of the arbitrary region designated by the pointer within the editing image region coincides with a lightness of the hue ring and hue bar chart, wherein, the editing image region, the hue ring, and the hue bar chart are provided on the graphical user interface, a phase range decision section is configured to determine if a color component of selected image data is within a phase range designated by a user, the graphical user interface includes a section enabling an adjustment of a degree of change between adjacent colors, the degree of change being a change in a relationship of a color component with respect to an angular phase of the color component, a color change relationship between the color component and the angular phase is implemented as determined by input from the graphical user interface if a result of the phase range decision section indicates that the selected image data is within the phase range, and a position of the mark and a position of the bar indicate the color information of the arbitrary region designated by the pointer.

19. A display apparatus which performs a method of displaying a graphical user interface on the display device, comprising the steps of:

storing color information in a color information storage section of a computer memory, the color information corresponds to an arbitrary region designated via a pointer in an editing image region;

explicitly displaying the color information with respect to the arbitrary region designated by the pointer as coordinate values in the form of numerical values on a color coordinate system given by a phase, a saturation and a lightness, the coordinate values including coordinate values for red (R), green (G), and blue (B); and interlocking a display lightness of the hue ring or the hue bar such that a lightness of the arbitrary region designated by the pointer within the editing image region coincides with a lightness of the hue ring and hue bar chart, wherein, the editing image region and the coordinate values are provided on the graphical user interface, a phase range decision section is configured to determine if a color component of selected image data is within a phase range designated by a user, the graphical user interface includes a section enabling adjustment of a degree of change between adjacent colors, the degree of change being a change in a relationship of a color component with respect to an angular phase of the color component, and a color change relationship between the color component and the angular phase is implemented as determined by input from the graphical user interface if a result of the phase range decision section indicates that the selected image data is within the phase range.

20. A display apparatus which performs a method of displaying a graphical user interface on a display device, comprising the steps of:

storing color information regarding an arbitrary region designated via a pointer in an editing image region;

acquiring lightness information of a region designated via the pointer based on the color information and interlocking the display lightness of a hue ring or a hue bar chart to be used for color adjustment of the region with the display lightness given by the lightness information such that a lightness of the arbitrary region designated by the pointer within the editing image region coincides with a lightness of the hue ring and hue bar chart; and interlocking a display lightness of the hue ring or the hue bar such that a lightness of the arbitrary region designated by the pointer within the editing image region coincides with a lightness of the hue ring and hue bar chart, wherein, a phase range decision section is configured to determine if a color component of selected image data is within a phase range designated by a user, the graphical user interface includes a section enabling an adjustment of a degree of change between adjacent colors, the degree of change being a change in a relationship of a color component with respect to an angular phase of the color component, and a color change relationship between the color component and the angular phase is implemented as determined by input from the graphical user interface if a result of the phase range decision section indicates that the selected image data is within the phase range.

21. A non-transitory computer readable storage medium having a computer program stored thereon which when executed causes a computer to execute the steps of:

storing color information regarding an arbitrary region designated via a pointer in an editing image region;

explicitly displaying a mark, which specifies color coordinates corresponding to the color information, on a hue ring prepared for color adjustment, and explicitly displaying a bar on a hue bar chart, wherein, the editing image region, the hue ring, and the hue bar chart are displayed on a graphical user interface, a phase range decision section is configured to determine if a color component of selected image data is within a phase range designated by a user, the graphical user interface includes a section enabling an adjustment of a degree of change between adjacent colors, the degree of change being a change in a relationship of a color component with respect to an angular phase of the color component, a color change relationship between the color component and the angular phase is implemented as determined by input from the graphical user interface, and a position of the mark and a position of the bar indicate the color information of the arbitrary region designated by the pointer if a result of the phase range decision section indicates that the selected image data is within the phase range.

22. A computer including a non-transitory computer readable storage medium having stored thereon a logical instructions that when executed by the computer causes the computer to execute the steps of:

storing color information regarding an arbitrary region designated via a pointer in an editing image region;

explicitly displaying the color information with respect to the arbitrary region designated by the pointer as coordinate values in the form of numerical values on a color coordinate system given by a phase, a saturation and a lightness, the coordinate values including coordinate values for red (R), green (G), and blue (B); and interlocking a display lightness of the hue ring or the hue bar such that a lightness of the arbitrary region designated by the pointer within the editing image region coincides with a lightness of the hue ring and hue bar chart, wherein, the editing image region and the coordinate values are provided on a graphical user interface, a phase range decision section is configured to determine if a color component of selected image data is within a phase range designated by a user, the graphical user interface includes a section enabling an adjustment of a degree of change between adjacent colors, the degree of change being a change in a relationship of a color component with respect to an angular phase of the color component, and a color change relationship between the color component and the angular phase is implemented as determined by input from the graphical user interface if a result of the phase range decision section indicates that the selected image data is within the phase range.

23. A computer including a non-transitory computer readable storage medium having stored thereon logical instructions that when are executed by the computer causes the computer to execute the steps of:

storing color information regarding an arbitrary region designated via a pointer in an editing image region of a graphical user interface;

acquiring lightness information of a region designated via the pointer based on the color information and interlocking the display lightness of a hue ring or a hue bar chart to be used for color adjustment of the region with the display lightness given by the lightness information such that a lightness of the arbitrary region designated by the pointer within the editing image region coincides with a lightness of the hue ring and hue bar chart; and interlocking a display lightness of the hue ring or the hue bar such that a lightness of the arbitrary region designated by the pointer within the editing image region coincides with a lightness of the hue ring and hue bar chart, wherein, a phase range decision section is configured to determine if a color component of selected image data is within a phase range designated by a user, the graphical user interface includes a section enabling an adjustment of a degree of change between adjacent colors, the degree of change being a change in a relationship of a color component with respect to an angular phase of the color component, and a color change relationship between the color component and the angular phase is implemented as determined by input from the graphical user interface if a result of the phase range decision section indicates that the selected image data is within the phase range.

* * * * *